US010746560B2

(12) United States Patent
Luchner et al.

(10) Patent No.: US 10,746,560 B2
(45) Date of Patent: Aug. 18, 2020

(54) INTERACTIVE MAPPING

(71) Applicant: Byton Limited, Hong Kong (HK)

(72) Inventors: Wolfram Luchner, Los Altos Hills, CA (US); Ari Romano Pfefferkorn, Cupertino, CA (US); Gerhard Kremer, San Jose, CA (US)

(73) Assignee: Byton Limited, Hong Kong (HK)

( * ) Notice: Subject to any disclaimer, the term of this patent is extended or adjusted under 35 U.S.C. 154(b) by 72 days.

(21) Appl. No.: 15/696,018

(22) Filed: Sep. 5, 2017

(65) Prior Publication Data

US 2019/0072405 A1 Mar. 7, 2019

(51) Int. Cl.
*G01C 21/36* (2006.01)
*G06Q 10/10* (2012.01)
(Continued)

(52) U.S. Cl.
CPC .......... *G01C 21/3614* (2013.01); *B60K 35/00* (2013.01); *G01C 21/343* (2013.01); *G01C 21/362* (2013.01); *G01C 21/367* (2013.01); *G01C 21/3641* (2013.01); *G01C 21/3652* (2013.01); *G01C 21/3661* (2013.01);
(Continued)

(58) Field of Classification Search
CPC ............. G06Q 10/047; G06Q 10/1093; G06Q 10/1095; G08G 1/0969; G08G 1/202; G01C 21/343; G01C 21/362; G01C 21/3652; G01C 21/3664; G01C 21/3614
See application file for complete search history.

(56) References Cited

U.S. PATENT DOCUMENTS 5,987,377 A * 11/1999 Westerlage ............ G08G 1/202
340/994
D418,495 S 1/2000 Brockel et al.
(Continued)

FOREIGN PATENT DOCUMENTS

JP 06195056 A * 7/1994
JP 2010040000 A * 2/2010

OTHER PUBLICATIONS

Nimbarte, Mrudula, "Multi-touch screen interfaces and gesture analysis: a study", Advanced Computing: An International Journal ( ACIJ ), vol. 2, No. 6, Nov. 2011, pp. 113-121 (Year: 2011).*
(Continued)

*Primary Examiner* — Faris S Almatrahi
*Assistant Examiner* — David A Testardi
(74) *Attorney, Agent, or Firm* — Womble Bond Dickinson (US) LLP

(57) ABSTRACT

Embodiments are described of an apparatus including a computer to which are coupled a user identification device to identify an authorized user, a transceiver to receive and transmit user data between the computer and one or more user data sources associated with the authorized user, a navigation system, and one or more displays coupled to the computer. The computer constructs a timeline for the authorized user based on the user data over a specified time interval, wherein the timeline displays every user event that falls within the specified time interval, and simultaneously display the timeline and a map on one of the one or more displays, wherein the user's current position and the position of at least one user event from the timeline are identified on the map. Other embodiments are disclosed and claimed.

55 Claims, 28 Drawing Sheets

(51) Int. Cl.
*G06F 16/29* (2019.01)
*B60K 35/00* (2006.01)
*G01C 21/34* (2006.01)
*G06F 3/01* (2006.01)
*G06T 11/20* (2006.01)
*G06F 3/0484* (2013.01)
*G06F 3/0486* (2013.01)

(52) U.S. Cl.
CPC ......... *G01C 21/3676* (2013.01); *G06F 3/016* (2013.01); *G06F 3/017* (2013.01); *G06F 16/29* (2019.01); *G06Q 10/1095* (2013.01); *G06T 11/206* (2013.01); *B60K 2370/146* (2019.05); *B60K 2370/15* (2019.05); *B60K 2370/186* (2019.05); *B60K 2370/52* (2019.05); *G06F 3/0486* (2013.01); *G06F 3/04845* (2013.01); *G06T 2200/24* (2013.01)

(56) References Cited

U.S. PATENT DOCUMENTS

| | | |
|---|---|---|
| D519,516 S | 4/2006 | Najda et al. |
| 7,263,667 B1* | 8/2007 | Hoellerer .............. G01C 21/20 715/738 |
| D602,942 S | 10/2009 | Bennett et al. |
| D618,695 S | 6/2010 | Bennett et al. |
| D669,906 S | 10/2012 | Cranfill et al. |
| 8,442,758 B1* | 5/2013 | Rovik .................. G06Q 10/109 701/424 |
| D692,451 S | 10/2013 | Pearcy et al. |
| D697,927 S | 1/2014 | Seo et al. |
| D710,863 S | 8/2014 | Agnew |
| D731,526 S | 6/2015 | Chen et al. |
| D751,095 S | 3/2016 | Moon et al. |
| D753,155 S | 4/2016 | Nies et al. |
| D757,073 S | 5/2016 | Kim |
| D766,329 S | 9/2016 | Lee et al. |
| D768,188 S | 10/2016 | Li et al. |
| D771,078 S | 11/2016 | Nadiadi et al. |
| D773,501 S | 12/2016 | Olislagers et al. |
| D775,639 S | 1/2017 | Kim et al. |
| D776,147 S | 1/2017 | Simmons et al. |
| D779,523 S | 2/2017 | Jensen et al. |
| D782,495 S | 3/2017 | Laska et al. |
| D786,294 S | 5/2017 | Foss et al. |
| D790,582 S | 6/2017 | Chang et al. |
| D791,144 S | 7/2017 | Li et al. |
| D791,167 S | 7/2017 | Fleischmann et al. |
| D794,665 S | 8/2017 | Willis |
| D795,289 S | 8/2017 | Gottlieb |
| D809,545 S | 2/2018 | Ban et al. |
| D810,115 S | 2/2018 | Chaudhri et al. |
| D815,653 S | 4/2018 | Protzman et al. |
| D817,970 S | 5/2018 | Chang et al. |
| D820,295 S | 6/2018 | Wu et al. |
| D816,699 S | 8/2018 | Ledford et al. |
| D824,948 S | 8/2018 | Wu et al. |
| D824,949 S | 8/2018 | Wu et al. |
| D829,728 S | 10/2018 | Yoon et al. |
| D829,730 S | 10/2018 | Witt et al. |
| D830,378 S | 10/2018 | Li et al. |
| D830,389 S | 10/2018 | Witt et al. |
| D831,677 S | 10/2018 | Janicki |
| D832,875 S | 11/2018 | Yeung et al. |
| D835,649 S | 12/2018 | Balcom et al. |
| D835,665 S | 12/2018 | Kimura et al. |
| D837,812 S | 1/2019 | Kim et al. |
| D839,913 S | 2/2019 | Chen |
| D842,318 S | 3/2019 | Jager |
| D845,973 S | 4/2019 | Jaycobs |
| D846,575 S | 4/2019 | Harvey |
| D847,836 S | 5/2019 | Thoreson |
| D855,638 S | 8/2019 | Luchner |
| 2005/0091096 A1* | 4/2005 | Coates .................. G06Q 10/047 705/7.26 |
| 2006/0174211 A1* | 8/2006 | Hoellerer .............. G01C 21/20 715/782 |
| 2007/0245238 A1* | 10/2007 | Fugitt .................. G06F 3/0481 715/700 |
| 2009/0027332 A1* | 1/2009 | Cieler .................. B60K 35/00 345/156 |
| 2010/0030612 A1* | 2/2010 | Kim ...................... G01C 21/362 705/7.18 |
| 2010/0198458 A1* | 8/2010 | Buttolo ............... G01C 21/3652 701/36 |
| 2010/0332282 A1* | 12/2010 | Bradley ............. G01C 21/3438 705/7.19 |
| 2012/0202525 A1 | 6/2012 | Pettini |
| 2012/0197523 A1* | 8/2012 | Kirsch .................. G01C 21/362 701/426 |
| 2012/0203457 A1* | 8/2012 | Casey .................... H04W 4/02 701/533 |
| 2012/0209506 A1* | 8/2012 | Tamayama ........... G01C 21/343 701/410 |
| 2012/0226391 A1* | 9/2012 | Fryer ..................... G08G 1/202 701/1 |
| 2012/0330710 A1* | 12/2012 | Hauser .................. G06Q 10/10 705/7.15 |
| 2013/0151149 A1* | 6/2013 | Kristinsson ........ G06Q 10/1095 701/533 |
| 2013/0176232 A1* | 7/2013 | Waeller .................. B60K 35/00 345/173 |
| 2013/0325319 A1* | 12/2013 | Moore .................. G01C 21/36 701/412 |
| 2014/0026088 A1* | 1/2014 | Monte ................ G01C 21/3682 715/765 |
| 2014/0309871 A1* | 10/2014 | Ricci ........................ B60Q 1/00 701/36 |
| 2014/0309874 A1* | 10/2014 | Ricci ........................ G06F 21/31 701/36 |
| 2014/0316835 A1* | 10/2014 | Cortes ................ G06Q 10/1095 705/7.19 |
| 2014/0331185 A1* | 11/2014 | Carls ...................... B60K 37/06 715/835 |
| 2014/0365107 A1* | 12/2014 | Dutta ..................... G01C 21/343 701/408 |
| 2015/0015521 A1* | 1/2015 | Okohira .................. B60K 37/06 345/173 |
| 2015/0161828 A1* | 6/2015 | Davidson ......... G06Q 10/06398 701/99 |
| 2015/0212683 A1* | 7/2015 | Arita ........................ G09G 5/00 715/786 |
| 2015/0379394 A1* | 12/2015 | Thaler .................... G06N 3/063 706/20 |
| 2016/0116292 A1* | 4/2016 | An .......................... G01C 21/26 701/454 |
| 2016/0148162 A1* | 5/2016 | Du ...................... G06Q 10/1093 705/7.18 |
| 2016/0191793 A1 | 6/2016 | Yang et al. |
| 2016/0320848 A1* | 11/2016 | Wild ...................... B60K 37/06 |
| 2017/0059337 A1* | 3/2017 | Barker .................. G06F 16/955 |
| 2017/0103327 A1* | 4/2017 | Penilla .................... B60L 58/12 |
| 2017/0212633 A1* | 7/2017 | You ........................ B60K 35/00 |
| 2018/0208060 A1* | 7/2018 | Kim ..................... B60W 50/038 |

OTHER PUBLICATIONS

"Sygic: Voucher Edition" Nov. 24, 2014, mobile9, site visited Jan. 24, 2019: https://gallery.mobile9.com/asf/amn5yqds51vy/sygic-voucher-edition/.

White, Terry, "Why the iPad is becoming my Favorite GPS Navigation Device" Oct. 12, 2011, Terry White's Tech Blog, site visited Jan. 24, 2019: https://terrywhite.com/ipad-favorite-gps-navigation-device/.

"Rio landscape" Feb. 1, 2017, YouTube, site visited Jan. 24, 2019: https://www.youtube.com/watch?v=PnXG3XMHhc4.

"Kilimanjaro Ascent Fly-Over" Dec. 11, 2017, YouTube, site visited Jan. 24, 2019: https://www.youtube.com/watch?v=P8hhQsHtqlc.

PCT International Search Report for PCT/US2018/048646 dated Oct. 16, 2018.

(56) References Cited

OTHER PUBLICATIONS

PCT Written Opinion for PCT/US2018/048646 dated Oct. 16, 2018.
Teraoka, T., "A Study of Exploration of Heterogeneous Personal Data Collected from Mobile Devices and Web Services," Fifth FTRA International Conference on Multimedia and Ubiquitous Engineering, Jun. 28-30, 2011, IEEE, Loutraki, Greece, [Abstract Only].
The Notice of Allowance for U.S. Appl. No. 29/616,340 dated Feb. 6, 2019, 8 pages.
The Notice of Allowance for U.S. Appl. No. 29/616,342 dated Feb. 6, 2019, 6 pages.
The Ex Parte Quayle for U.S. Appl. No. 29/616,354 mailed Oct. 18 2019, 5 pages.
The Restriction Requirement for U.S. Appl. No. 29/616,354 dated Oct. 1, 2018, 5 pages.
The Final Office Action for U.S. Appl. No. 15/696,018 dated Nov. 22, 2019, 42 pages.
The Non-Final Office Action for U.S. Appl. No. 15/696,018 dated Apr. 24, 2019, 44 pages.
"New features to better find, track, and rate your deliveries" 17 May 2017, Doordash, site visited May 8, 2019; https://blog.doordash.com/new-features-to-better-find-track-and-rate-your-deliveries-f93a31e57e6f.
"Track Delivery", Sep. 1, 2016, dribble, site visited May 8, 2019; https://dribble.com/shots/2937268-Track-Delivery.

* cited by examiner

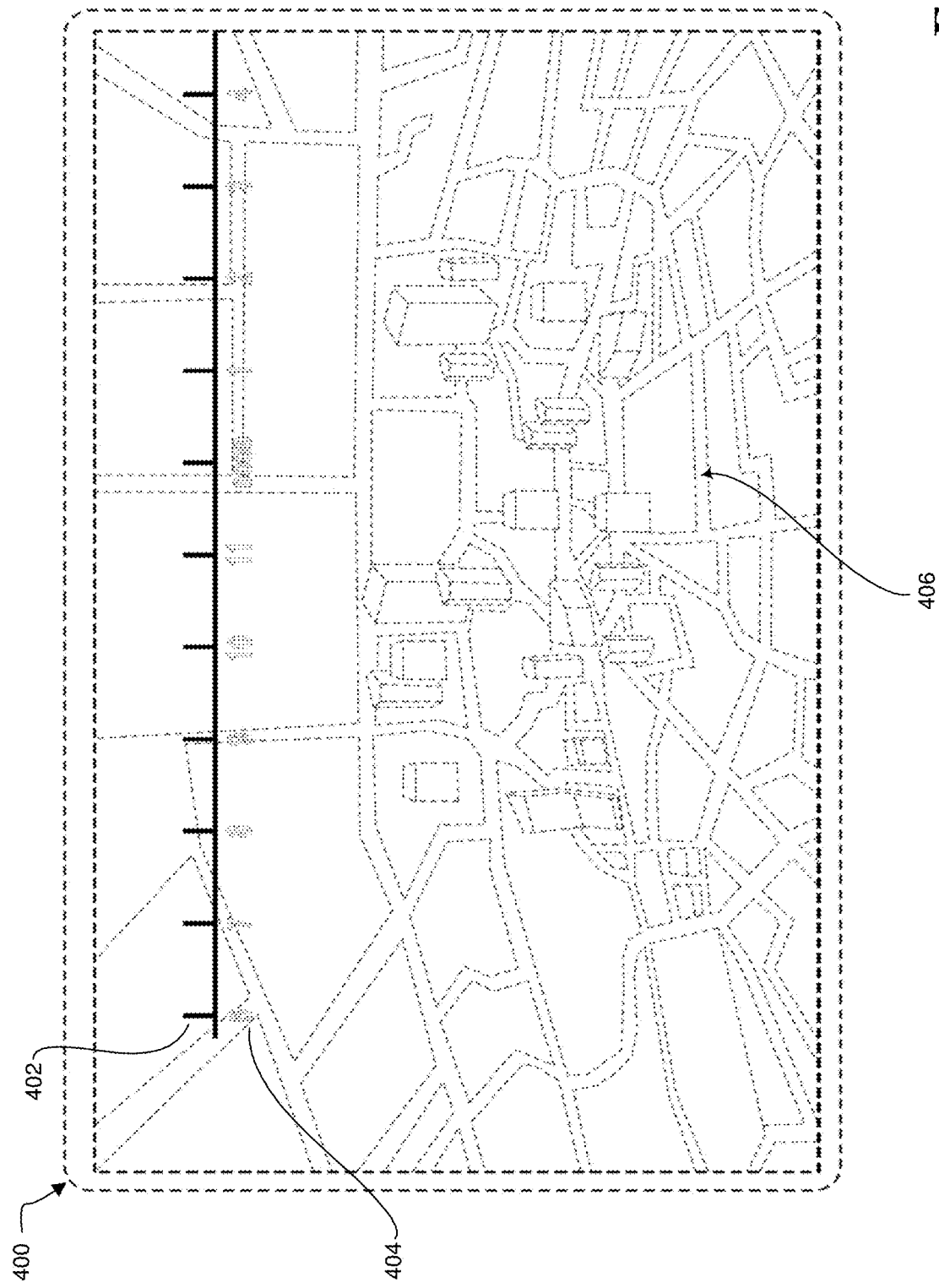

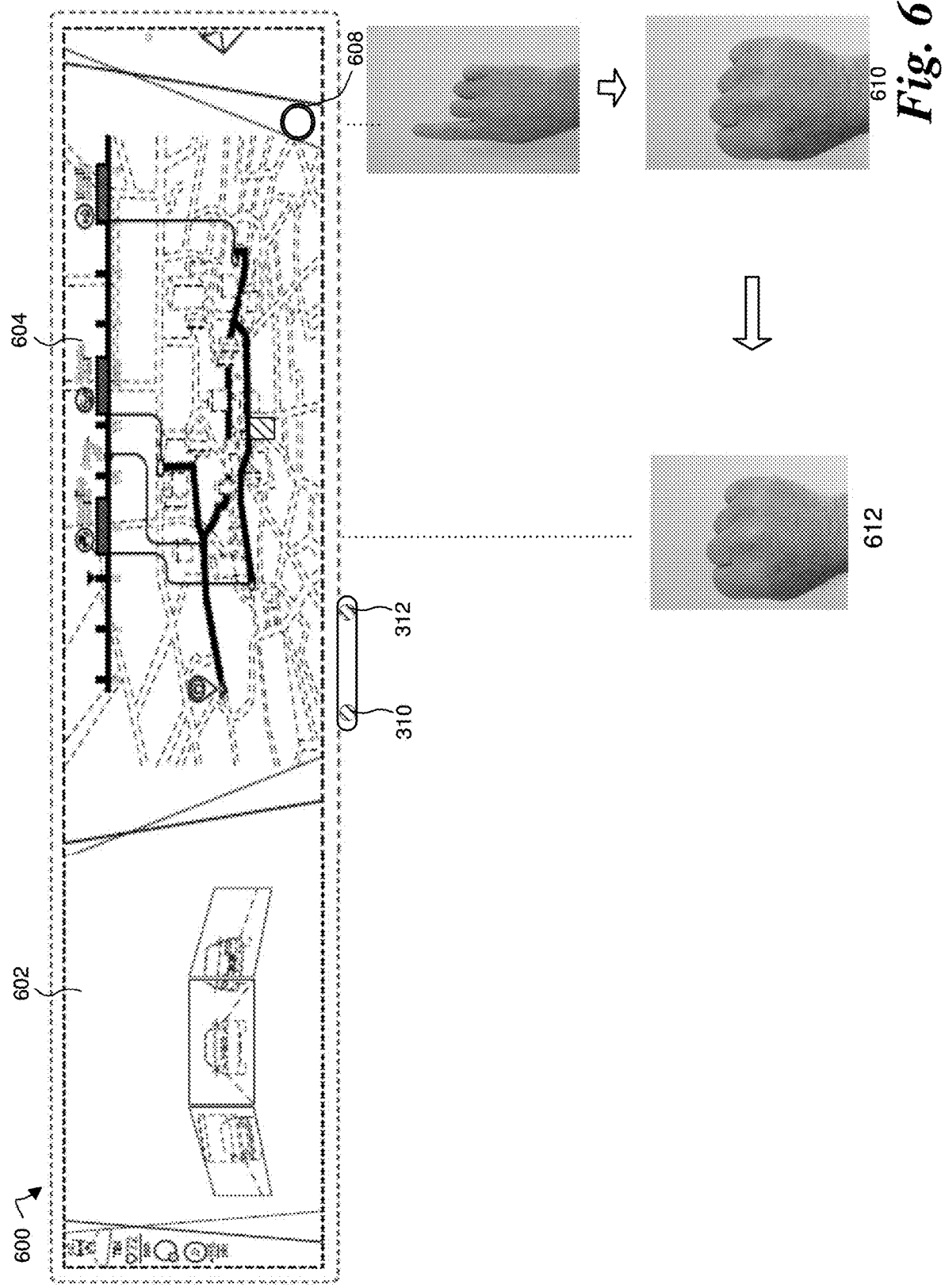

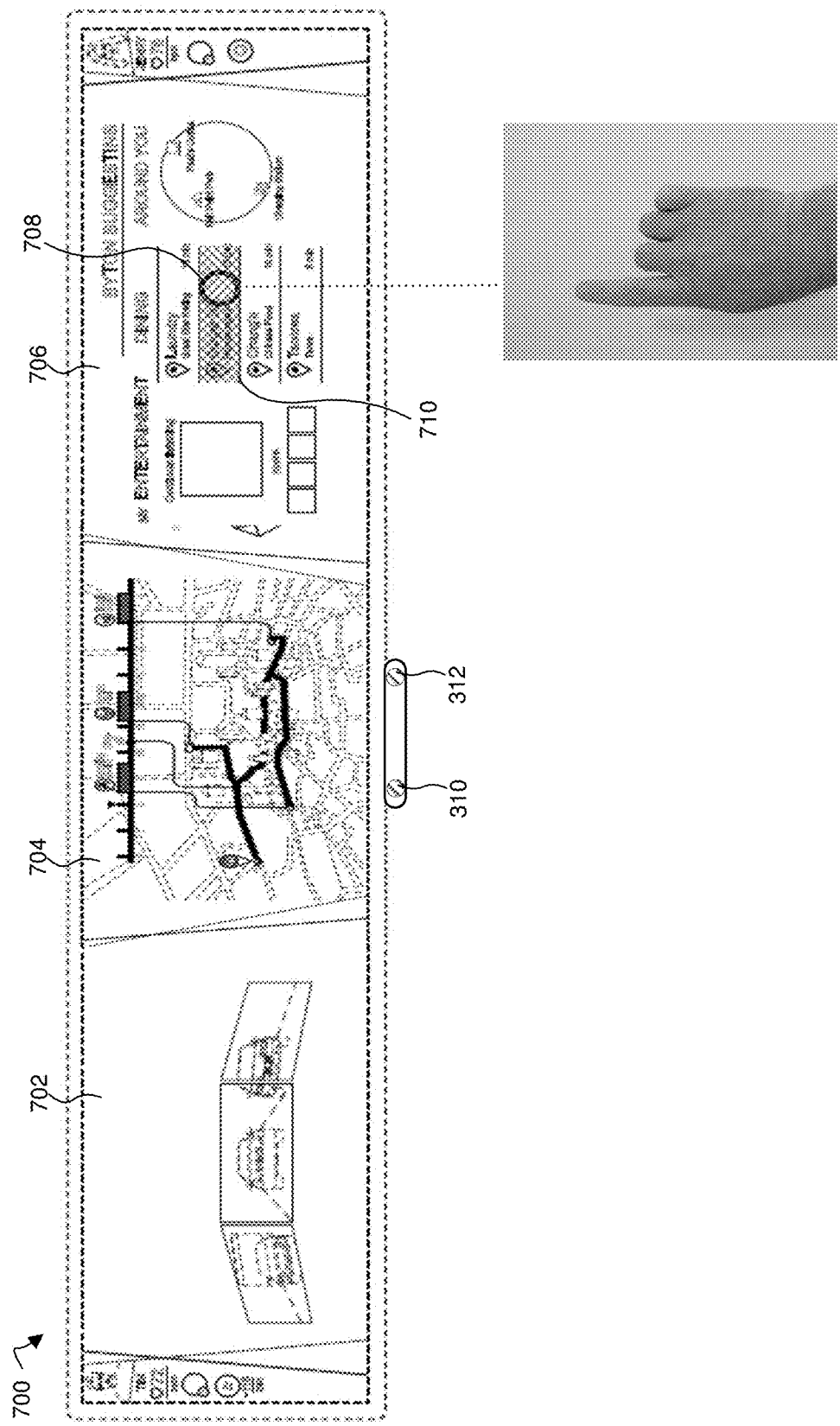

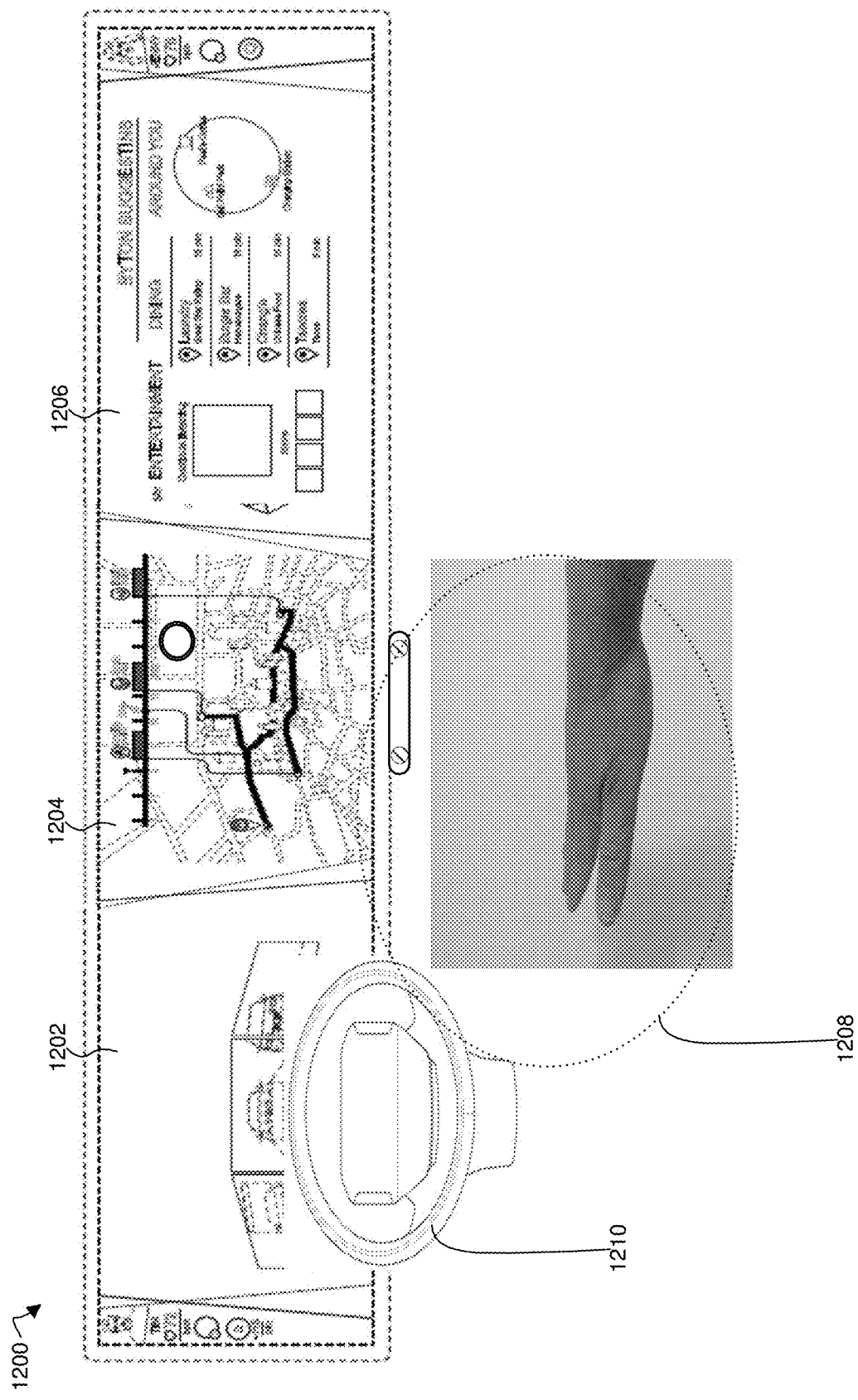

INTERACTIVE MAPPING

TECHNICAL FIELD

The disclosed embodiments relate generally to mapping and navigation and in particular, but not exclusively, to an interactive mapping scheme for use in a car.

BACKGROUND

Car navigation system have revolutionized driving by providing accurate step-by-step instruction on how to go to a specified destination. But despite their enormous benefits, one problem with existing navigation system is that data entry is awkward. Each destination must generally be entered into the system one at a time, and the data entry process can be made difficult by awkward user interfaces. Even after all the destination data is entered, the user interfaces usually make any follow-on interaction with the navigation system awkward as well.

SUMMARY

The disclosure describes embodiments of an apparatus and method for interactive mapping. The apparatus includes a computer to which are coupled a user identification device to identify an authorized user, a transceiver to receive and transmit user data between the computer and one or more user data sources associated with the authorized user, a navigation system, and one or more displays coupled to the computer. The computer constructs a timeline for the authorized user based on the user data over a specified time interval, wherein the timeline displays every user event that falls within the specified time interval, and simultaneously display the timeline and a map on one of the one or more displays, wherein the user's current position and the position of at least one user event from the timeline are identified on the map.

The method includes synchronizing local user data in a local user data storage with user data received from one or more user data sources, wherein the local user data includes one or more user events and each user event is described by a dataset including at least a start time, an end time, and a location. A timeline is constructed for an authorized user based on the local user data over a specified time interval, wherein the timeline displays every user event that falls within the specified time interval. The timeline and a map are simultaneously displayed on one of one or more displays, wherein the user's current position and the position of at least one user event from the timeline are identified on the map.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIGS. 4A-4D are diagrams of embodiments of a map display for an interactive mapping system.

FIGS. 6A-6D are diagrams of embodiments of interaction to change the number or size of software-defined displays.

FIGS. 7A-7C are diagrams of an embodiment of user interaction with multiple displays.

FIG. 12 is a diagram of an embodiment of user interaction to activate and deactivate a gesture recognition system.

DETAILED DESCRIPTION OF THE ILLUSTRATED EMBODIMENTS

Embodiments are described of an apparatus, system and method for interactive mapping. Specific details are described to provide an understanding of the embodiments, but one skilled in the relevant art will recognize that the invention can be practiced without one or more of the described details or with other methods, components, materials, etc. In some instances, well-known structures, materials, or operations are not shown or described in detail but are nonetheless encompassed within the scope of the invention.

Reference throughout this specification to "one embodiment" or "an embodiment" means that a described feature, structure, or characteristic can be included in at least one described embodiment. Appearances of "in one embodiment" or "in an embodiment" thus do not necessarily all refer to the same embodiment. Furthermore, the described features, structures, or characteristics may be combined in any suitable manner in one or more embodiments.

Figure 1:
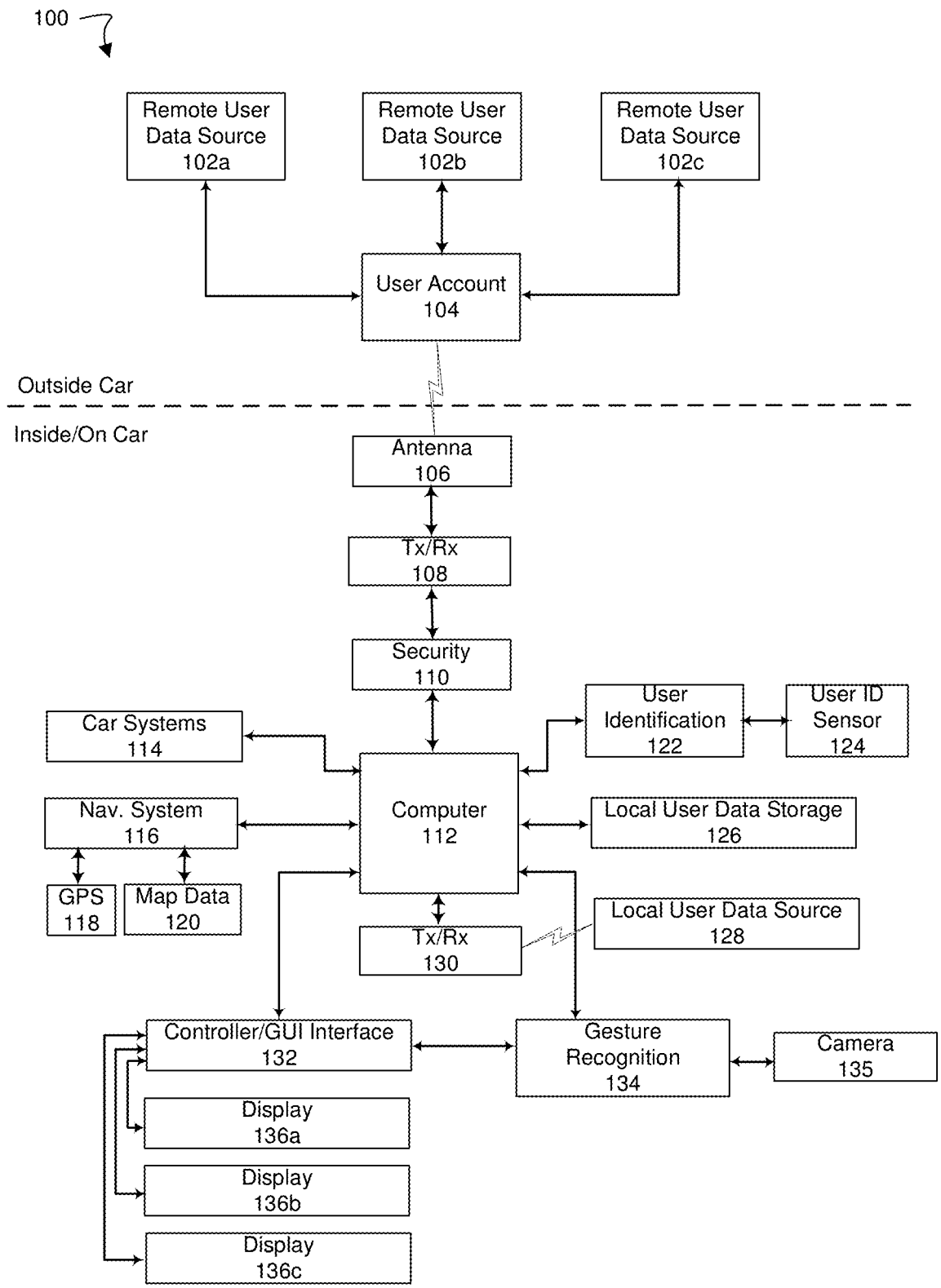
FIG. 1 is a block diagram of an embodiment of an interactive mapping system.

FIG. 1 illustrates an embodiment of an interactive mapping system 100 that can be used in a car. System 100 includes elements outside the car as well as elements inside or on the car. Outside the car, a user account 104 can be coupled to one or more remote user data sources 102*a*-102*c* to exchange data with the remote user data sources. User account 104 can receive data from, transmit data to, and process data exchanged with remote user data sources. User account 104 can, for example, be an account established on servers set up by the car manufacturer. Remote user data sources 102*a*-102*c* can include user accounts established on remoter servers such as a user's contacts, calendar, health-related accounts, and social media accounts. In other embodiments user account 104 can be omitted and its functions of assembling the events and their datasets can instead be performed by computer 112; in such cases, transceiver 108 can communicate directly with remote user data sources 102*a*-102*c* through antenna 106, rather than communicating with the remote user data sources through user account 104.

User account 104 is set up by the user and linked to remote user data sources 102*a*-102*c* so that user account 104 can retrieve data from remote user data sources 102*a*-102*c* to determine what events a user has upcoming and so that user account 104 can use the retrieved data to assemble a dataset for each event. In one embodiment, the dataset for each event can include at least a starting time, an ending time, and a location. In other embodiments the dataset can also include additional data, such as names, photos, and contact information for people associated with each event. By aggregating information this way, the mapping scheme makes information from various apps accessible on a single display.

For instance, user account 104 could retrieve appointments from a user's calendar. The events retrieved from the calendar might include location information, but if they don't user account 104 can obtain that information from a different remote user data source, such as the user's contacts or social media account, or by searching the Internet. For example, if an event on the user's calendar is an appointment with Dr. Smith from 2-3 pm but the calendar has no location for Dr. Smith, user account 104 can access another user data source—the user's contacts, for instance—to establish a location for Dr. Smith. And if a location for Dr. Smith cannot be deduced from a remote user data source, it can also be looked up on the Internet, for example based on the user's current location.

Inside the car, a computer 112 is communicatively coupled to various elements including to: a transceiver 108 via security gateway 110; car systems 114; a navigational system 116 that includes a position sensor or GPS 118 as well as a database including map data 120; a user identification system 122 coupled to one or more user ID sensors 124; a local user data storage 126 and a second transceiver 130 through which computer 112 can exchange data with a local user data source 128. A controller/graphic user interface (GUI) interface 132 is communicatively coupled to computer 112, and one or more displays 136a-136c are coupled to controller/GUI interface 132. A user input device such as gesture recognition system 134 with at least one camera 135 is also communicatively coupled to computer 112.

Computer 112 is the hub of system 100. In the illustrated embodiment computer 112 is a programmable general-purpose computer that includes at least memory, one or more microprocessors, and storage. Other embodiments, however, can include one or more other types of computers, such as application specific integrated circuits (ASIC). Although represented as a single computer in the illustrated embodiment, in other embodiments computer 112 can include multiple processors or, in some embodiments, can comprise multiple separate computers that can communicate and coordinate with each other. In the illustrated embodiment the elements communicatively coupled to computer 112 are represented as components separate from the computer, but in other embodiments one or more of these other components can be implemented in software and run on the computer 112; in other words, in other embodiments one or more of the elements communicatively coupled to computer 112 can actually be processes running on computer 112.

Transceiver 108 is communicatively coupled via security gateway 110 to computer 112. Transceiver 108 is also coupled to antenna 106 to allow it to wirelessly exchange data with user account 104, for instance via Wi-Fi, cellular, or satellite communication. Security gateway 110 is communicatively coupled in the link between transceiver 108 and computer 112 to avoid downloading viruses, malicious code, or other data that could damage system 100 or, in particular, that could adversely influence car systems 114 and thus compromise vehicle safety. Security gateway 110 in one embodiment can be a computer running software such as anti-virus or anti-malware software User identification system 122 is coupled to one or more user ID sensors 124, and together they are used to identify authorized users of system 100. In one embodiment user ID sensor 124 can include one or more facial recognition cameras, but in other embodiments other types of sensors such as biometric sensors (e.g., fingerprint or retinal scan) can be used. In still other embodiments, user identification system 122 can be the traditional username/password system in which a user enters their username and password via a keypad or other user input system. User ID sensors 124 can be positioned inside or outside the car (see, e.g., FIGS. 3A-3C) and used to identify the driver and/or passengers in the car, all of whom can be users of interactive mapping system 100.

Car systems 114 or coupled to computer 112 so that they can be controlled and/or adjusted by the driver or passengers of the car. Among other things, car systems 114 can include those that control the engine, steering, suspension, air-conditioning, interior lighting, exterior lighting, locking, and so on.

Navigation system 116 is coupled to computer 112 to provide navigation capability for the car. Among other things, navigation system 116 includes a position sensor such as a global positioning system (GPS) system 118, as well as a database that includes map data 120. Map data 120 can be commercially available map data obtained from map data sources such as Google, Bing (Microsoft), TomTom, Garvin, etc. Navigation system 116 uses GPS 118 to determine the current position of the car and uses map data 120 to show the current position of the car on a map, as well as the map locations of future events, on at least one of displays 136a-136c (see below).

Local user data storage 126 is coupled to computer 112 to locally store data retrieved from user account 104. The data stored in local user data storage 126 may be raw data obtained directly from user account 104, or can be data that has been further processed by computer 112. Data stored in local user data storage 126 can then be used to construct an interactive mapping timeline and map (see, e.g., FIGS. 4A-4D).

In some embodiments, rather than obtain user data from remote user data sources 102a-102c through user account 104, it may be desirable to obtain the user data from a local user data source 128. In one embodiment, local user data source 128 can be a mobile phone that the user carries with them in the car. Local user data source 128 can have versions of remote user data sources 102a-102c on it, as well as a version of user account 104. For instance, if remote data source 102a is a calendar application—Google calendar, for instance—and the user has a Google calendar app on their mobile phone that synchronizes with Google's calendar server, then all the data available from remote data source 102a is also available from local user data source 128. In another embodiment, it could be necessary to use local user data source 128 if, for instance, a connection cannot be established between transceiver 108 and user account 104 or between user account 104 and remote user data sources 102.

Transceiver 130 is coupled to computer 112 to access data from local user data source 128 and transfer it to local user data storage 126. Local user data source 128 can then communicate, wirelessly or by wire, with transceiver 130. Wireless communication between local user data source 128 and transceiver 130 can be accomplished, for instance, using short-range wireless protocols such as Bluetooth, but in other embodiments it can communicate using other wireless communication formats such as Wi-Fi.

Controller/graphic user interface (GUI) 132 is coupled to computer 112 and also coupled to at least one display. In the illustrated embodiment three displays 136a-136c are coupled to controller/GUI interface 132, but in other embodiments the number of displays coupled to the interface can be different than shown. Although illustrated and referred to as separate displays, displays 136a-136c can be different parts of a single display. As further discussed below (see FIGS. 2, 4A-4D, and 5), one of displays 136a-136c can be used to display a combined timeline/map of the user's events and another of displays 136a-136c can be used to show other information, such as events which can be added to the user's timeline and shown on the map.

A gesture recognition system 134 coupled to one or more cameras 135 serves as a user input device for users within the automobile to interact with the system 100, in particular to interact with the timeline/map display and other displays. In other embodiments other user input devices can be used, instead of or in addition to gesture recognition system 134, to perform the same functions and actions that can be performed with gesture recognition system 134.

Gesture recognition system 134 is coupled to computer 112 and in some embodiments can be directly coupled to controller/GUI interface 132. The one or more cameras 135 coupled to gesture recognition system 134 can be located in various places within a car's cabin; for instance, in one embodiment that there can be cameras for the driver and every passenger. The one or more cameras 135 can capture gestures, motions, or gesture/motion combinations made by the driver and one or more of the passengers. In one embodiment the gestures and motions can be hand gestures and motions, but other embodiments can, instead of or in addition to hand gestures and motions, use facial gestures and motions. The gesture control essentially provides a remote touch pad. Examples of hand gestures that can be used are: the user zooms in with gestures by grabbing and pulling towards the user; moving the user hand up and down, and left and right, to move objects up and down, and left and right; and rotating objects such as the map with a scoop gesture.

Among other things, gesture recognition system 134 allows the user to use gestures, motions, or gesture/motion combinations to interact with the timeline and map shown on one of displays 136a-136c. Interaction with the timeline can include deleting existing events, modifying existing events, or adding new events. In one embodiment, (see FIG. 5) events displayed on another of screens 136a-136c can be added to the timeline by selecting them from the screen from the display on which they are shown and dragging them to the display on which the timeline is shown. User interaction with a map can include panning zooming, and rotating the map.

Figure 2:
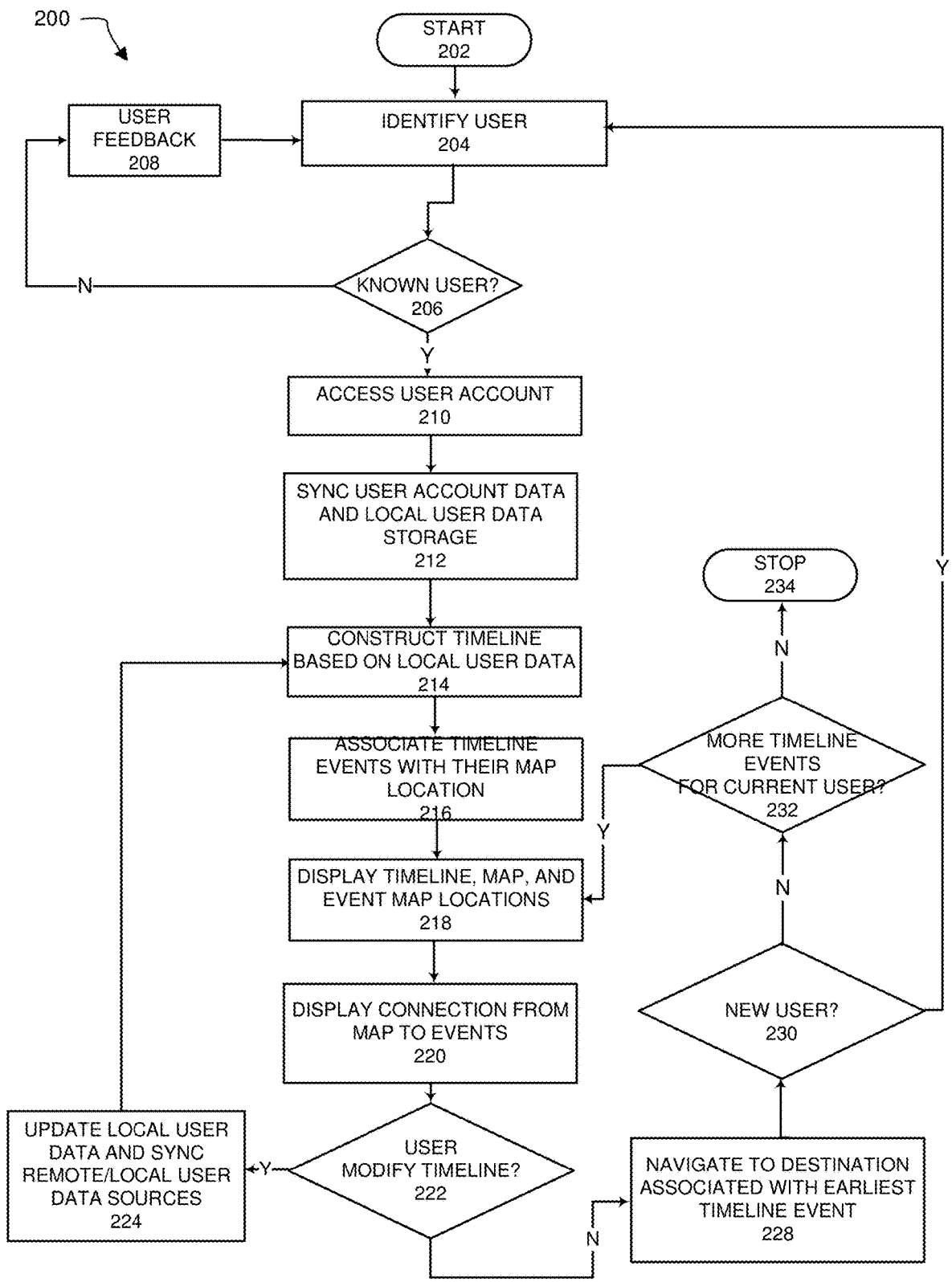
FIG. 2 is a flowchart illustrating an embodiment of operation of an interactive mapping system such as the one in FIG. 1.

FIG. 2 illustrates an embodiment of an operation process 200 for system 100. The process starts at block 202 and proceeds to block 204, where it attempts to identify a user trying to use the system. At block 206 the process checks whether the user identified at block 204 is a known and authorized. If the user at block 204 is unknown or unauthorized the process goes to block 208, where it provides user feedback indicating that the user is unknown or unauthorized, and then returns to block 204 to attempt to identify another user. But if at block 206 the user identified at block 204 is known and authorized, at block 210 the process accesses the authorized user's user account 104 and then proceeds to block 212, where it synchronizes the event data from user account 104 with the data contained in local user data storage 126.

At block 214, the event data from local user data storage 126 is used to construct a timeline and at block 216 the process associates each timeline event with its map location. At block 218, the process displays the timeline, the map, and the map locations of each timeline event on a display. At block 220, the map display shows a path among all the event locations shown on the map and a connection from at least one of the events on the timeline to its corresponding map location. At block 222 the process checks whether the user has modified the timeline, for instance by modifying an event shown on the timeline, deleting event found on the timeline, or adding a new event to the timeline. If at block 222 the process determines that the timeline has been modified, it proceeds to block 224 where it updates the local user data storage 126 and synchronizes the local user data storage with user account 104, remote user data sources 102, and, if applicable, local user data source 128.

If at block 222 the process determines that there are no timeline modifications, the process proceeds to block 228, where it navigates the car to the location of the first event on the timeline—that is, the event closest in time to the current time. Having arrived at the destination associated with the selected timeline event, at block 230 the process checks whether there is a new user, for instance if the original user was a passenger who has now arrived at their destination and the and the driver now wants to go to another location associated with an event on their schedule. If at block 230 the process determines that there is a new user the process returns to block 204 to identify and authorize the user. But if at block 230 the process determines that there is no new user, it goes to block 232 were it checks whether there are more events on the current user's timeline. If at block 232 there are more events on the current user's timeline, the process returns to block 218 were displays the timeline, the map, and the locations of the events remaining on the timeline and then proceeds to the remainder of the process. But if at block 232 the process determines that there are no more timeline events for the current user and that there are no new users, the process stops a block 234.

Figure 3A:
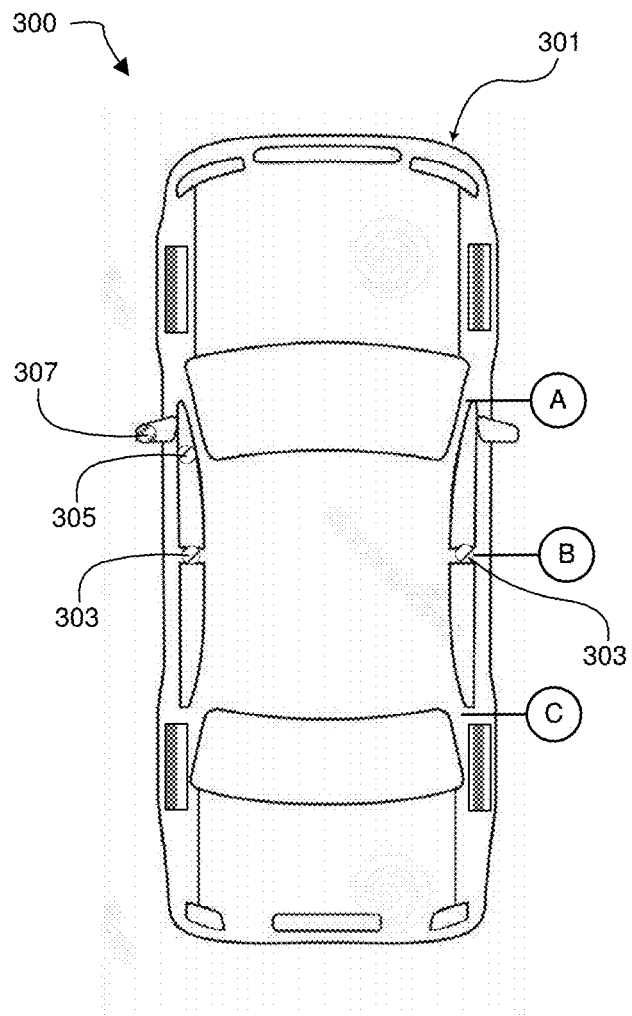
FIGS. 3A-3C are diagrams of a car embodiment of an interactive mapping system.
Figure 3B:
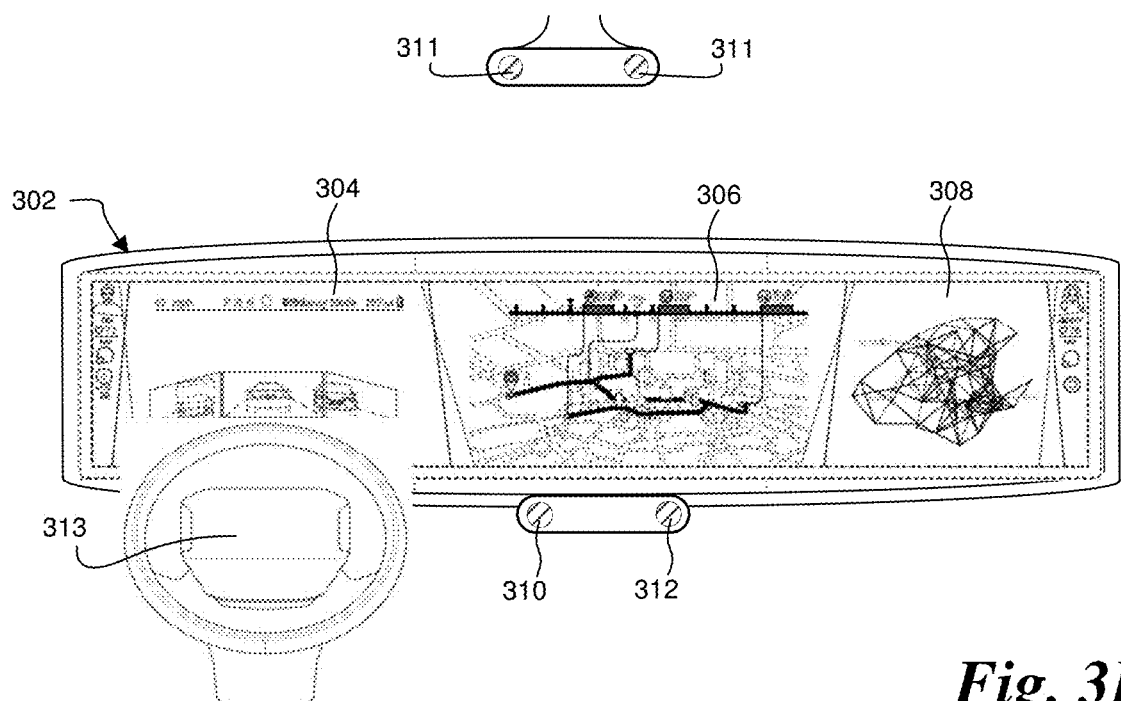
Figure 3C:
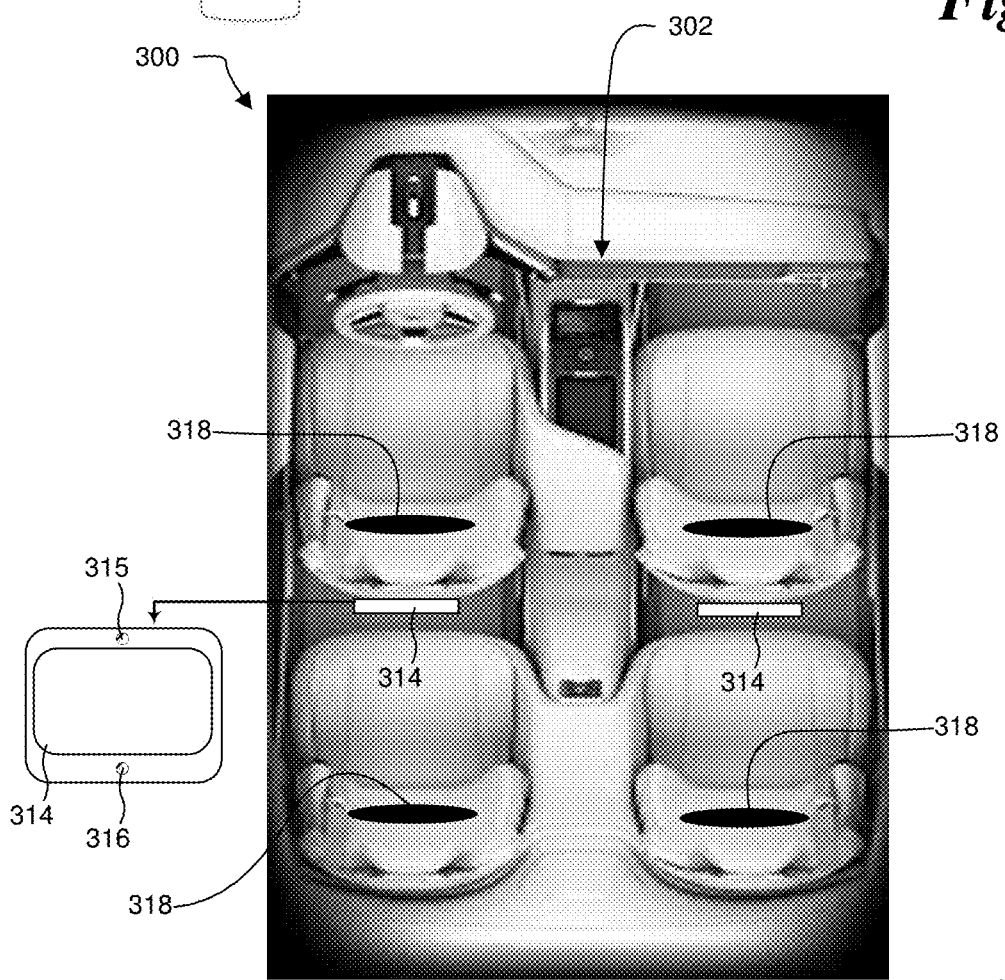

FIGS. 3A-3C illustrate details of an automobile implementation of system 100. The different components described are coupled to each other substantially as system 100 and the elements of system 100 not shown in the drawings can be put elsewhere in the car, for instance in the dashboard or in the trunk.

FIG. 3A illustrates an embodiment 300 of the placement of user ID sensors on the exterior of a car 301. An automobile usually includes 3 pillars: an A pillar on both the driver and passenger sides between the windshield and the front side windows; a B pillar on both the driver and passenger sides between the front and rear side windows; and a C pillar on both the passenger and driver sides between the rear side window and the rear window.

In an embodiment, the user ID sensors are facial recognition cameras positioned on the B pillar on both the driver and passenger sides of the car to identify the driver and passengers before they enter the car. But in other embodiments cameras can be positioned differently. For instance, a facial recognition camera 305 can be placed in the car's interior pointing outward through the side window so as to capture an image of the face of the driver. In yet another embodiment, a facial recognition camera 307 can be put on the driver's side mirror. In other embodiments other types of sensors can be used and can be positioned differently than shown. For example, in an embodiment using fingerprint recognition fingerprint sensors could be put on the doors along the bottom of the windows.

FIG. 3B illustrates an automobile dashboard 302 which includes a plurality of displays. In the illustrated embodiment dashboard 302 includes a single display which can be configured to display different things in three software-configurable display regions 304, 306, and 308, but in other embodiments dashboard 302 can have a different number of display regions than shown and in still other embodiments regions 304, 306, and 308 can be physically separate displays. Dashboard 302 also includes hand gesture recognition cameras 310 and 312 positioned below display regions 304, 306, and 308, where they can capture video or images of a at least one of the driver's hands and both hands or a front passenger. Facial cameras 311 can also be positioned in the cabin, for instance where a rear-view mirror is or, if not present, where it normally would be, to capture video or still images of a driver and front passenger's faces. Cameras 311 can be used for facial recognition in embodiments that do not have external cameras as shown in FIG. 3A, or can be used for gesture recognition systems that support facial gesture or motion recognition. A display 313 can be positioned in the center of the steering wheel to act as a user input device and to provide additional display capabilities for the driver.

FIG. 3C is a plan view of an automobile interior 300. Automobile interior 300 includes dashboard 302 and also includes a driver's seat, a front passenger seat, and two rear passenger seats. As described above display regions 304, 306, and 308 in dashboard 302 provide displays for persons seated in the driver's seat and the front passenger seat. To provide displays for persons sitting in the rear passenger seats, rear passenger displays 314 can be positioned in the backs of the driver's seat and the front passenger seat. Each rear passenger display 314 includes a display unit on which a timeline and map can be displayed for each passenger as well as a facial camera 315 to capture selfies or facial gestures and motions and a hand camera 316 to capture hand gestures and motions of each passenger.

A feedback mechanism 318 is positioned in the back of the driver's seat, as well as in the back of the front passenger seat and the backs of the rear passenger seats to provide haptic feedback to users regarding use of the mapping system. Each person occupying a seat in the car can thus control the timeline and map on their own display via gestures, be they hand gestures, facial gestures, etc., and receive feedback on their interaction with the system.

Figure 4B:
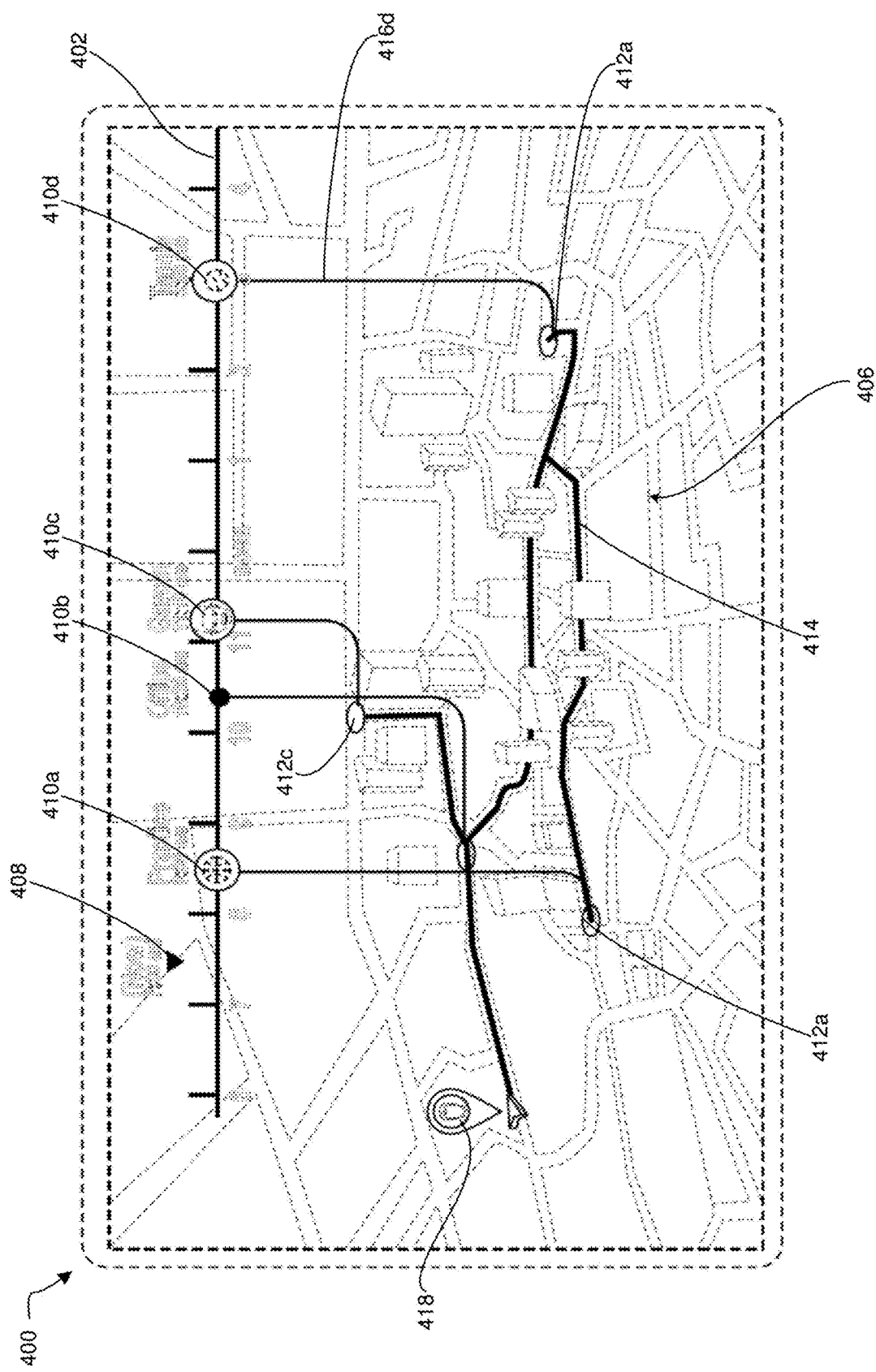

FIGS. 4A-4D illustrate embodiments of a map display. FIG. 4A illustrates an embodiment of the basic layout of a map display 400 before addition of a user's events to the timeline and map. Timeline 402 is positioned horizontally across the top portion of map display 400 with navigation map 406 in a portion below it. Timeline 402 includes one or more tick marks along the top of the line, and each tick mark is labeled below the line with a corresponding time 404. The time span of timeline 402 can be specified by the user or can be determined from the time span of the user events that will be displayed on the timeline. Map 406 is shown as a three-dimensional navigation map, but in other embodiments map 406 can be two-dimensional. Whether three-dimensional or two-dimensional, map 406 can also include additional features such as satellite views, street views, or three-dimensional views (e.g., like Google Earth).

In the illustrated embodiment map 406 appears below timeline 402, but in other embodiments the timeline and map can be arranged differently in the display. For instance, timeline 402 could appear horizontally across the bottom of the screen with map 406 positioned above it, or timeline 402 could appear vertically along the left or right sides of the display with map 406 positioned next to it.

FIG. 4B illustrates an embodiment of map display 400 with a user's events added to timeline 402. A current-time indicator 408 is shown on timeline 402 to indicate the current time. One or more events 410a-410d are also shown at their respective times on timeline 402. Each event 410 can be shown on timeline 402 using an icon as shown for events 410a, 410c and 410d, or can be shown without an icon such as shown for event 410b. For timeline events with an icon, the icon can include additional information obtained from remote user data sources 102a-102c—for instance, a photo of a person associated with the event (see, e.g., event 410c)—or can have some sort of other graphic associated with the icon (see, e.g., events 410a and 410d). Additional or different information can also be associated with each event and displayed on the timeline. For instance, events with or without an icon can include a title (e.g., "tennis practice" or "pick up son from school"), or a display of the start and end times in text instead of graphics (for example, tennis practice is from 9:30 am-10:30 am). Color can also be used, for instance to improve the clarity of the display or highlight certain events.

A circle 412 corresponding to each event 410 is shown on map 406 to indicate the location of the event: circle 412a indicates the location on the map of event 410a, circle 412b indicates the location on the map of event 410b, and so on. The route from event to event over the time span of the timeline is calculated and a line 414 indicating the expected path to all the events is shown on map 406. To make it easier for the user to see which location corresponds to which event, the display also draws a line 416 between each event 410 and its corresponding location 412. An icon 418 indicating the car's current location is also shown on map 406. Thus, the system provides route guidance based on the activities on the time line.

Timeline 402 can be modified by user interaction with the map display using a user input device such as gesture recognition system 134. Modifying the timeline can involve at least deleting existing events, modifying existing events, and adding new events. Modifications to the timeline are automatically reflected on timeline 402 and map 406, and are automatically transmitted to local user data storage 126, user account 104, remote user data sources 102a-102c, and local user data source 128 so that the data in those places can be updated to reflect changes made by the user's interaction with the map display. In some embodiments, changes made by user interaction with the map display can also be transmitted, for instance via e-mail or text message, to persons associated with that event.

To modify an existing event, the user can simply select the desired event and modify it accordingly. For instance, if the user wants to change event 410b to a time before event 410a, they could use a gesture or motion to select event 410b and, having selected it, use a motion to slide the event to the left over the timeline to a time before event 410a, then use another gesture to fix the event at the new time. To delete event 410b, the user can simply select item 410b and use a gesture to delete it. To add an event, the user can either add it via another user input device connected to the system, or can select the item from another display and drag it to the mapping display (see, e.g., FIG. 5). Events can be modified even if not currently shown on the timeline. For instance, if the user wants to modify an event that happens later this week but the timeline shows only today's events, the user can select the timeline and then use a gesture or motion to scroll to the right to advance to a later time period until the event the user wants to modify appears on the timeline.

Figure 4C:
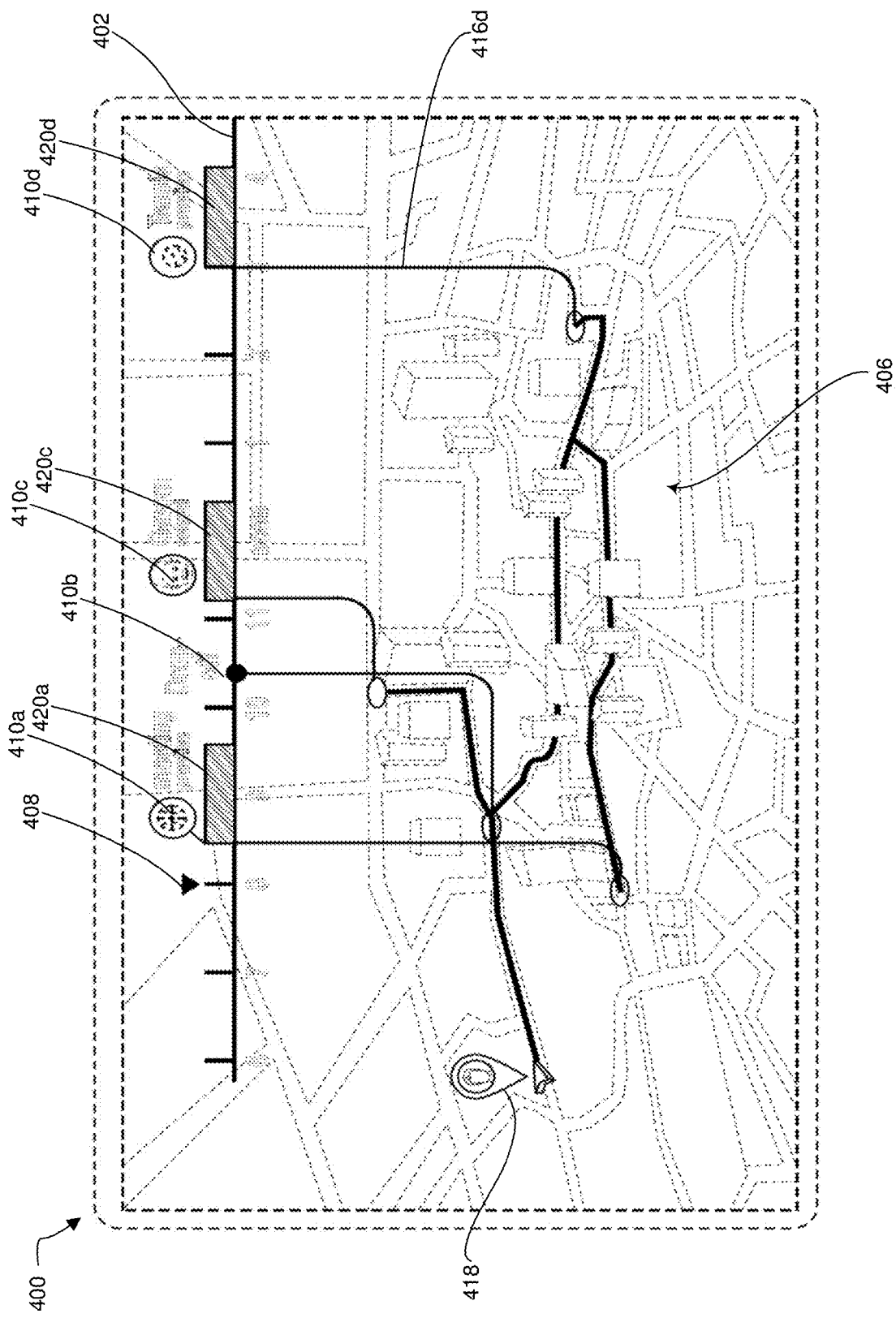
Figure 4D:
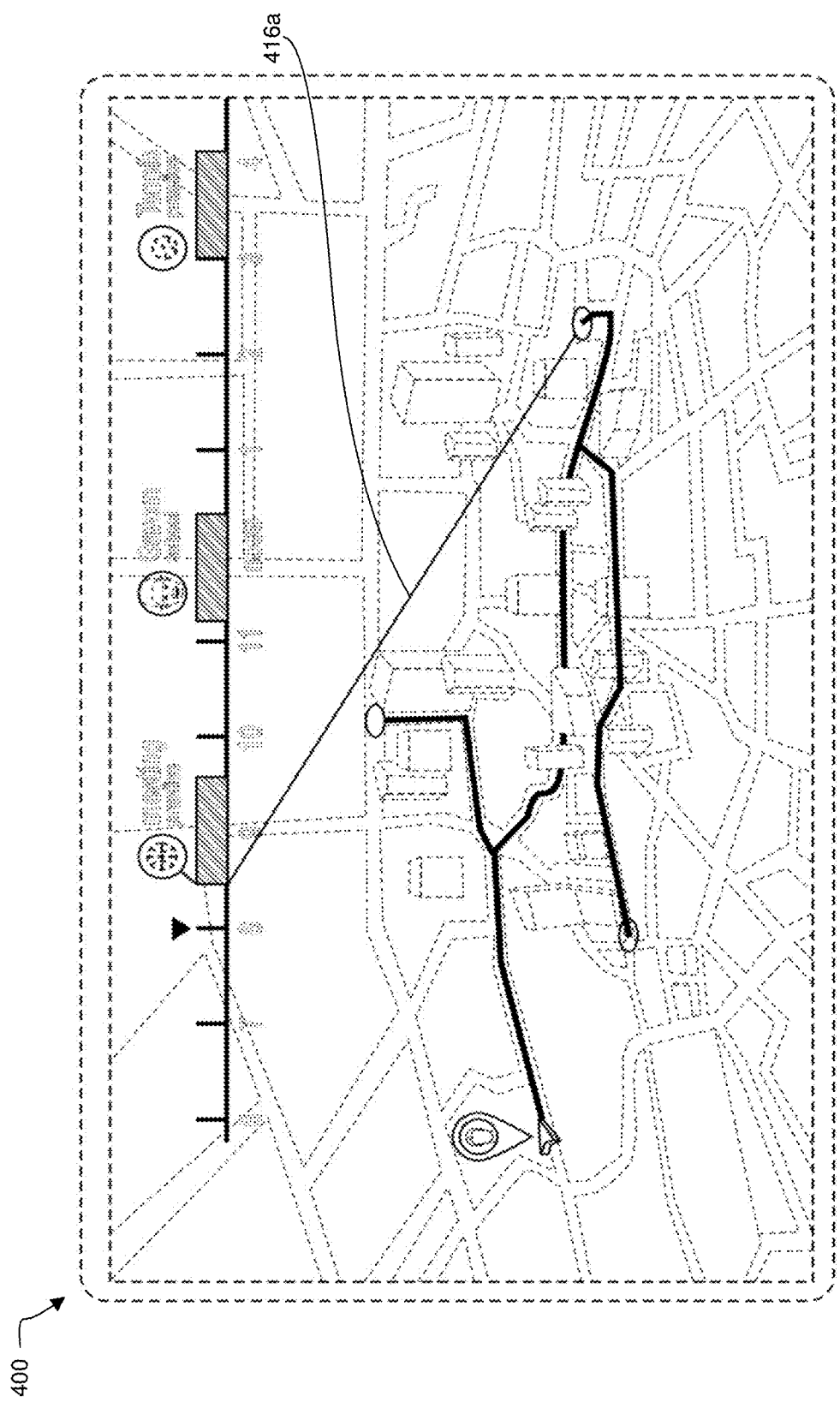

FIG. 4C illustrates another embodiment of mapping display 400. The mapping display of FIG. 4C is similar in most respects to the one of FIG. 4B; the primary difference is that in FIG. 4C each event has an indicator 420 that shows the start time and end time, and hence the duration, of each event on the timeline that has a duration exceeding a certain threshold. FIG. 4D is similar in most respects to FIG. 4B, the primary difference being that, to avoid clutter, in FIG. 4D only the earliest event—presumably the first one to navigate to or the one currently being navigated to—has a line joining the event on the timeline to its location in the map.

Figure 5:
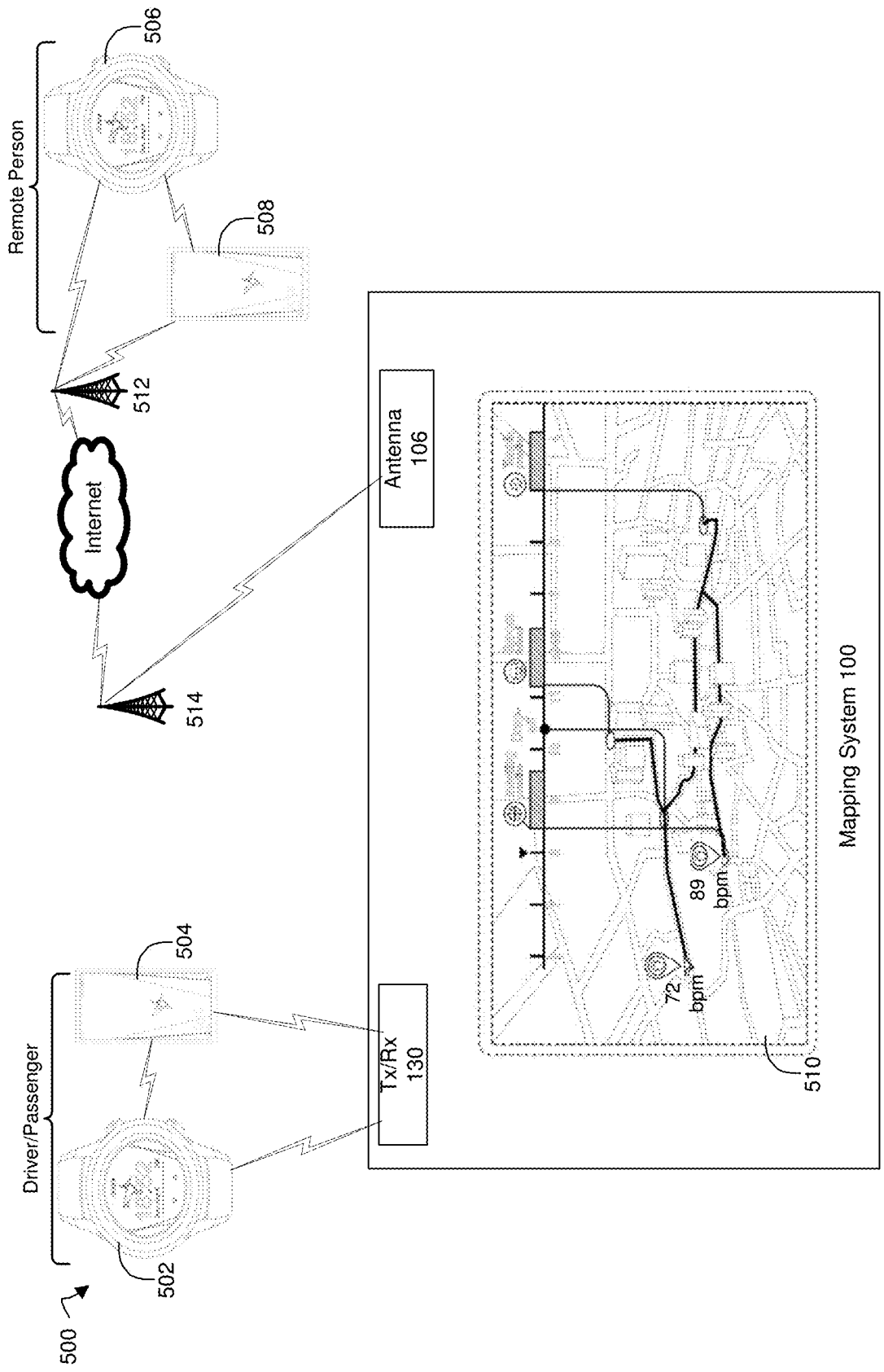
FIG. 5 is a diagram of an embodiment of interaction and data exchange between an interactive mapping system and other devices.

FIG. 5 illustrates an embodiment of a system 500 in which there can be interaction and data exchange between interactive mapping system 100 and other devices. In system 500 the driver, the passenger, or both, can have devices like a smartwatch 502 and a smartphone 504. These kinds of devices are usually carried on the user, so if they belong to the driver and passenger they will be inside the car. In the illustrated embodiment, smartphone 504 can communicate wirelessly with transceiver 130 via a wireless connection such as Bluetooth, and smartwatch 502 can also communicate with transceiver 103, either directly or through smartphone 504, also via a wireless connection such as Bluetooth protocol. In other embodiments one or more of the connections shown, such as between smartphone 504 and transceiver 130, can be wired instead of wireless.

A remote person—that is, someone outside the car—can also have one or both of a smart watch 506 and a mobile phone 508. Smartphone 508 can communicate with an antenna 512, for instance the antenna on a Wi-Fi router or a cellular antenna located on a tower. Smart watch 506 can communicate with smart phone 508 via a protocol such as Bluetooth or Wi-Fi, or in some instances can communicate directly with antenna 512, for instance via Wi-Fi or cellular connection. Antenna 512 and its associated electronics can exchange information, for instance via the internet, with another antenna 514, such as a cellular antenna or Wi-Fi. Antenna 514 can then send data to and receive data from antenna 106, which is on or in the car (see FIG. 1).

System 500 allows the driver and/or passengers to exchange data with one or more persons remote from the car and shown on a map. For instance, if smartwatches 502 and 506 can both measure heart rate, that information can be collected from both smartwatches and shown on map 510. In the illustrated embodiment, map 501 shows that the driver currently has a heart rate of 72 beats per minute (bpm), while the remote person has a heart rate of 89 beats per minute. Other types of data can also be exchanged. For instance, the remote person smart watch or smartphone can transmit the person's current location or, can transmit messages from the remote user to the driver or passenger, can change a meeting time with the driver or passenger (which would also be reflected in the map's timeline), etc.

Figure 6A:
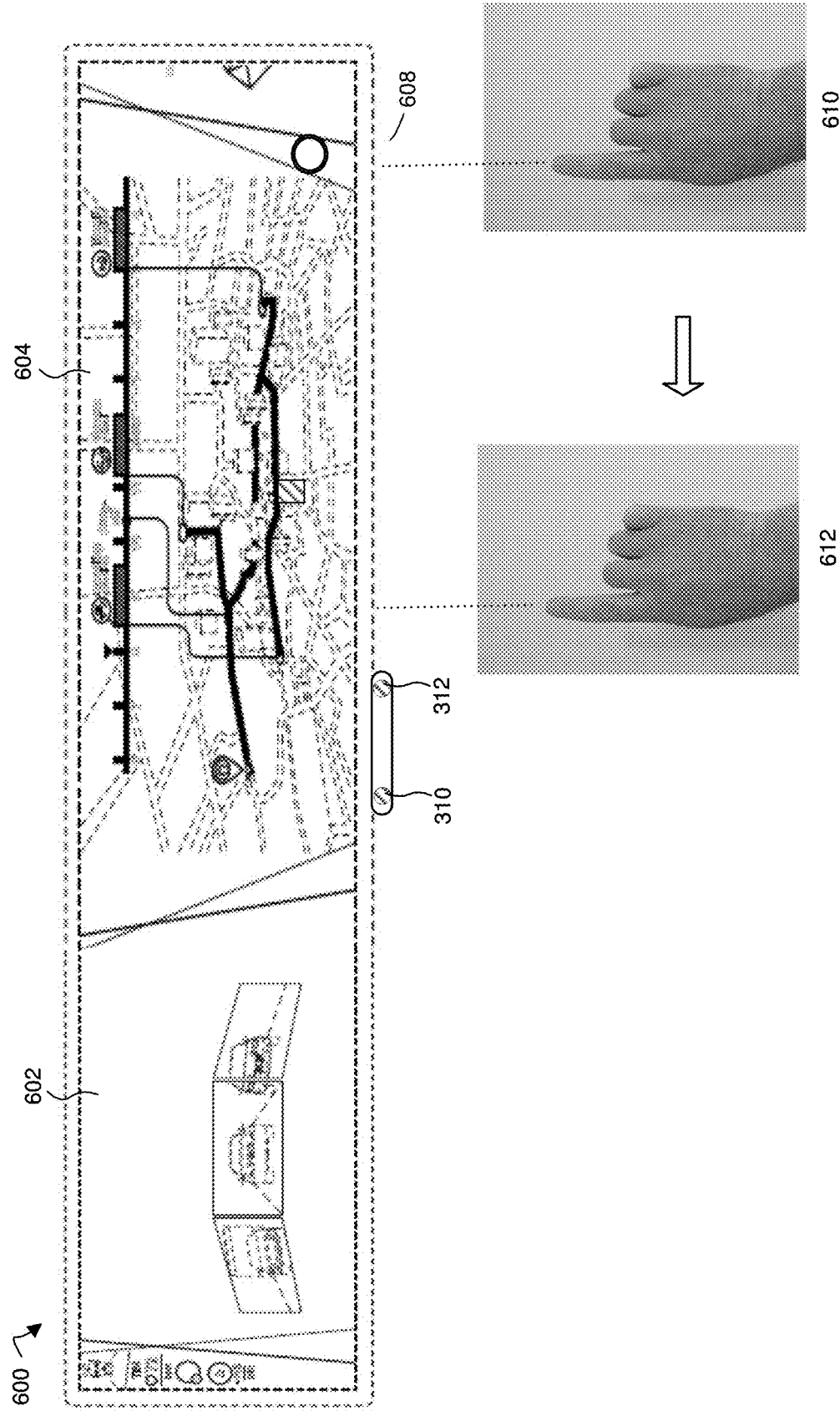
Figure 6B:
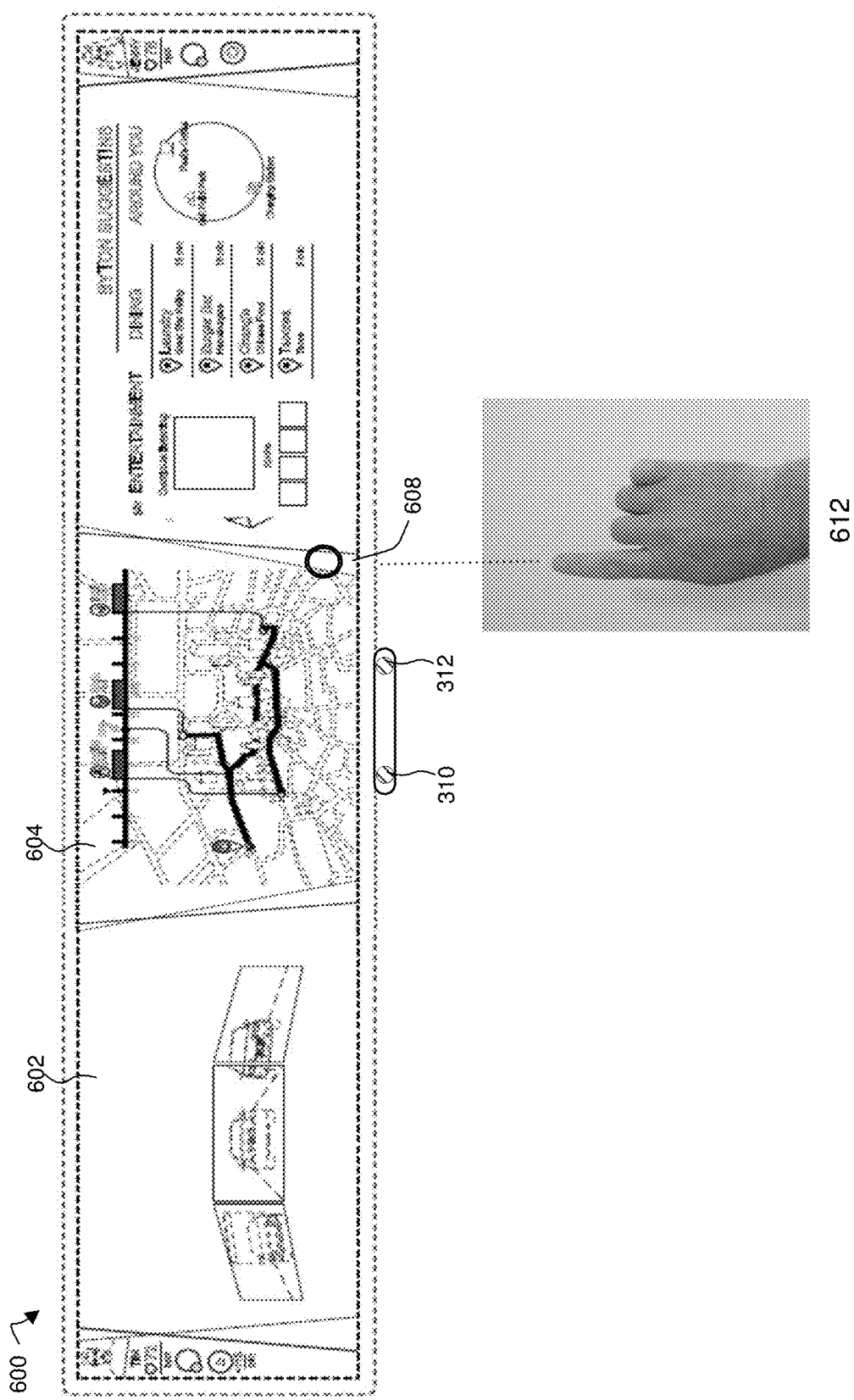

FIGS. 6A-6D illustrate embodiments of gesture interactions that resize the display regions in a software-defined display such as the one shown in FIG. 3B. In the illustrated embodiments, the screen is initially partitioned into two software-defined regions 602 and 604. In the illustrated embodiment, region 602 shows car-related information and an electronic rear-view mirror, while region 604 shows the map display for the mapping system. To create a third software-defined display region 606, the user can use gestures to shrink region 604. FIGS. 6A-6B illustrate a first embodiment. The user first makes a gesture in which they extend their index finger and then they position their hand such that circular cursor, which tracks the motion of the finger in substantially real time, is positioned at a location 610 that roughly corresponds to the location of an inter-region (or intra-display) separator. With the index finger still extended, the user moves their hand from position 610 to position 612. As the hand moves the inter-region separator follows, tracking the hand's motion in substantially real time, and stopping when the hand stops. And as inter-region separator 608 follows, a new software-defined display region 606 appears on one side of it, the right side in this embodiment, When the hand reaches position 612, the user simply lowers the hand to indicate that inter-region separator is now in the desired location and the three display regions are of the desired size (see FIG. 6B).

Figure 6D:
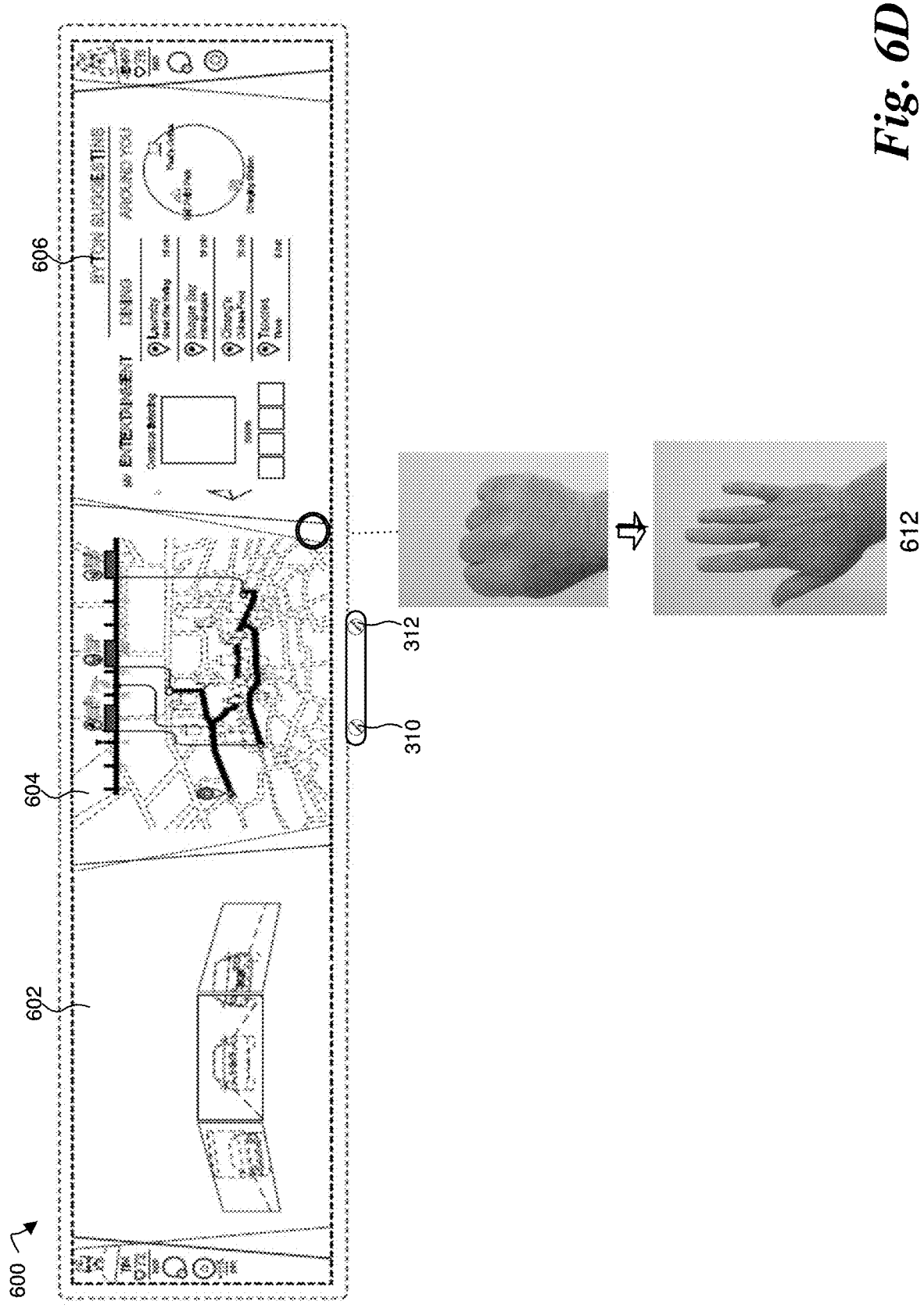

FIGS. 6C-6D illustrate a second embodiment. The user first makes a gesture in which they extend their index finger and then they position their hand such that circular cursor, which tracks the motion of the finger in substantially real time, is positioned at a location 610 that roughly corresponds to the location of an inter-region (or intra-display) separator 608. To select inter-region separator 608, the user then forms a fist, as if gripping separator 608. With the hand still in a fist, the user moves the fist from position 610 to position 612. As the fist moves the inter-region separator follows, tracking the fist's motion in substantially real time, and stopping when the fist stops. And as inter-region separator 608 follows, a new software-defined display region 606 appears on one side of it, the right side in this embodiment, When the fist reaches position 612, the user simply spreads their fingers into an open hand (see FIG. 6D), thereby releasing their grip on inter-region separator 608 to indicate that inter-region separator is now in the desired location and that display regions 604 and 606 have their desired size.

Figure 7B:
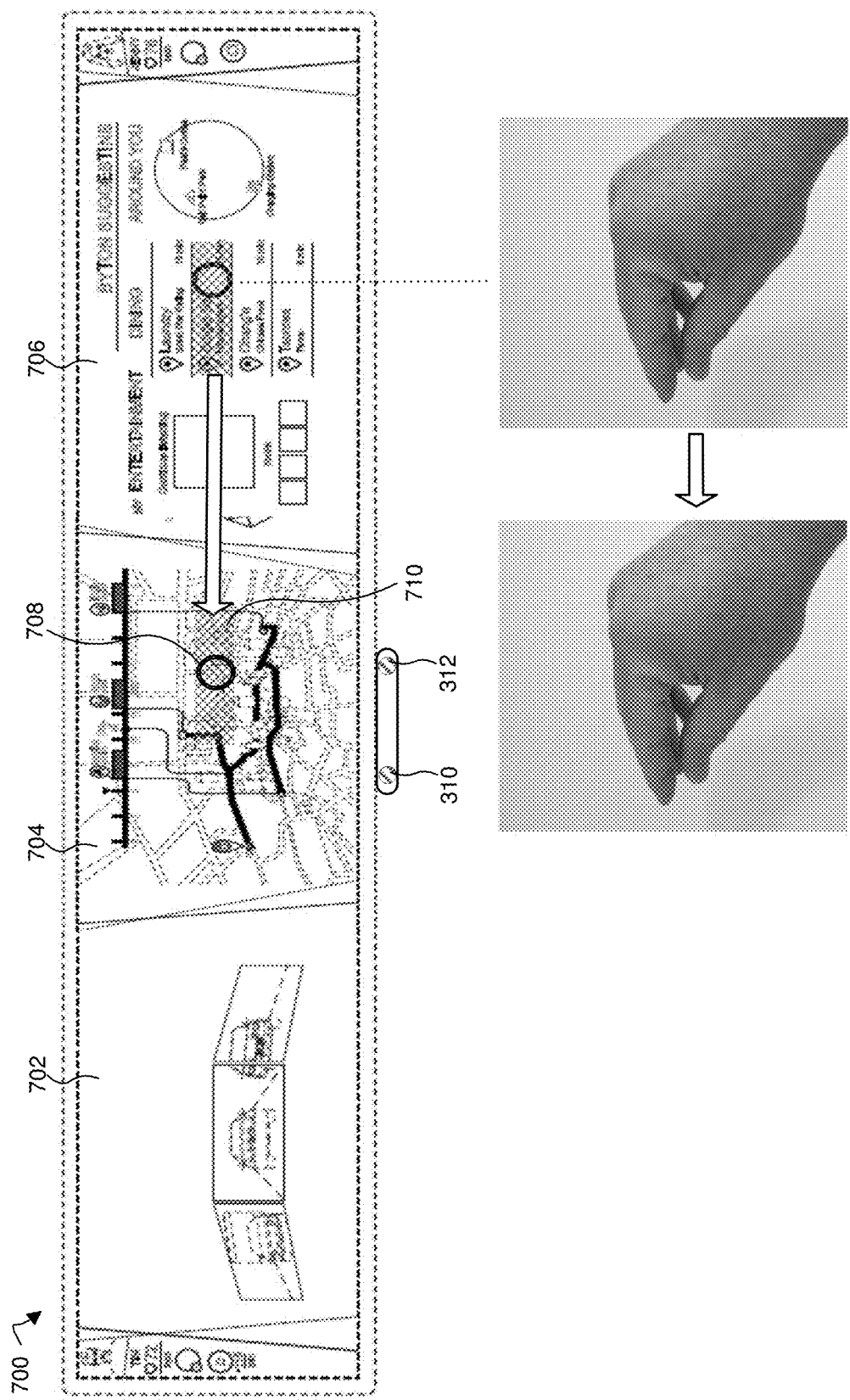
Figure 7C:
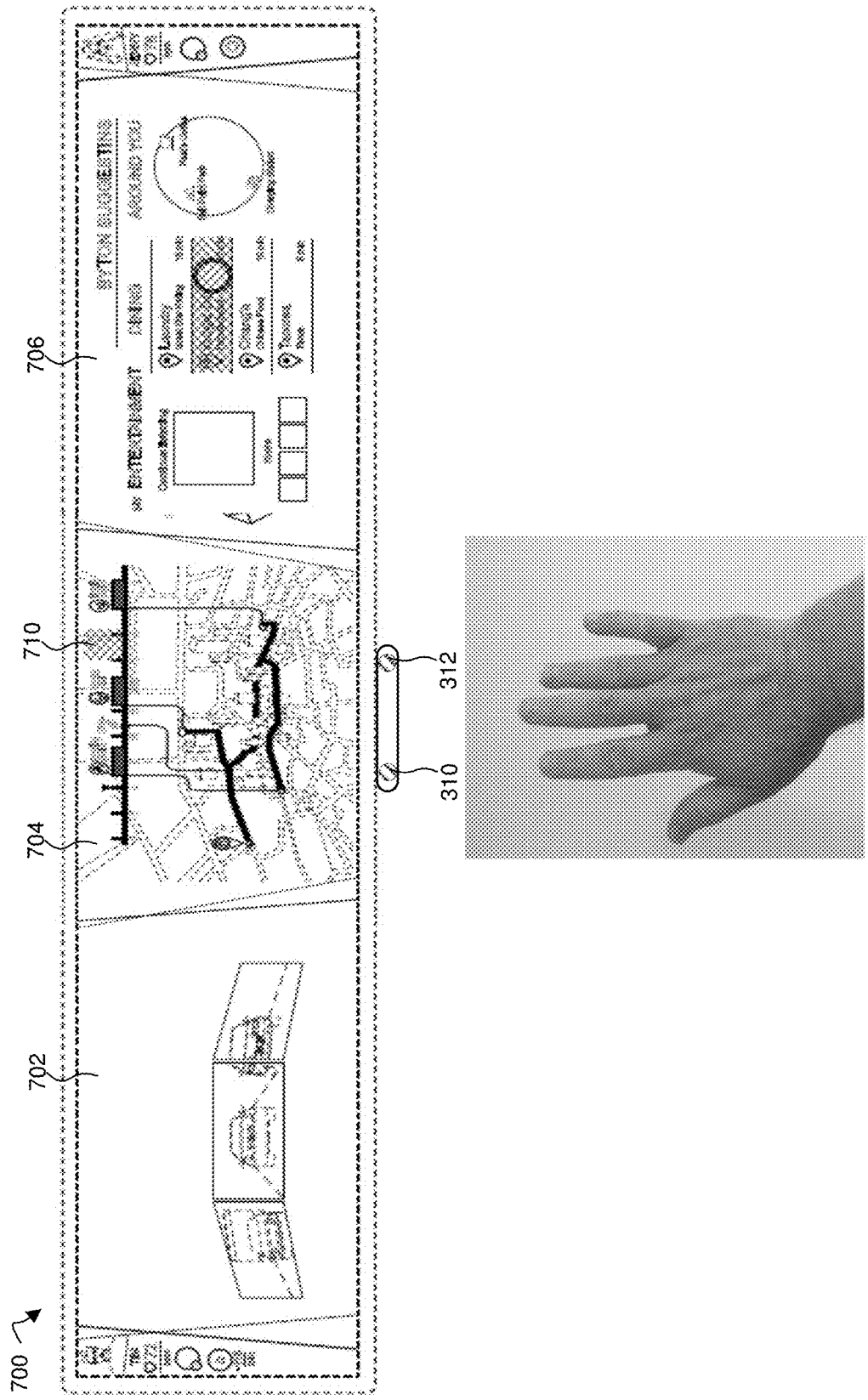

FIGS. 7A-7C together illustrate an embodiment of adding an event from another display region to the map timeline. Display 700 is a display such as the car dashboard display shown in FIG. 3B: it is a unitary display 700 configured to display different things on different software-define display regions 702, 704, and 706. In the illustrated embodiment the map and timeline are displayed in center region 704, while region 706 shows information such as available dining options. If a user wants to add one of the dining options from display region 706 to their schedule, they can use hand gestures and motions to select the desired entertainment event from region 706 and drag it to region 704.

As shown in FIG. 7A, in the illustrated embodiment, the user extends their index finger, causing circular cursor 708 to appear. With the index finger still extended, the user moves their hand and, as the hand moves cursor 708 follows the index finger, tracking the finger's motion in substantially real time, and stopping when the finger stops. When cursor 708 reaches desired item 710, the item highlights. As shown in FIG. 7B, when the desired item highlights the user changes to a pinching gesture, with the index, middle, and possibly the ring and pinky fingers brought together with the thumb, as if grasping the item. With the hand still making the pinching gesture, the user moves their hand toward the map display, as shown by the arrow, and cursor 708 and selected item 710 correspondingly move from display region 706 to display region 708, tracking the hand's motion in substantially real time, as shown by the arrow. As shown in FIG. 7C, the hand stops when cursor 708 and selected item 710 appear on the map. To release selected item 710 onto the map, the user extends all their finger, so that the hand is completely open with the palm facing the display. When released in display region 704, selected item 710 is added to the timeline and all the appropriate user data sources, local or remote, are updated accordingly to include the new event.

Figure 8A:
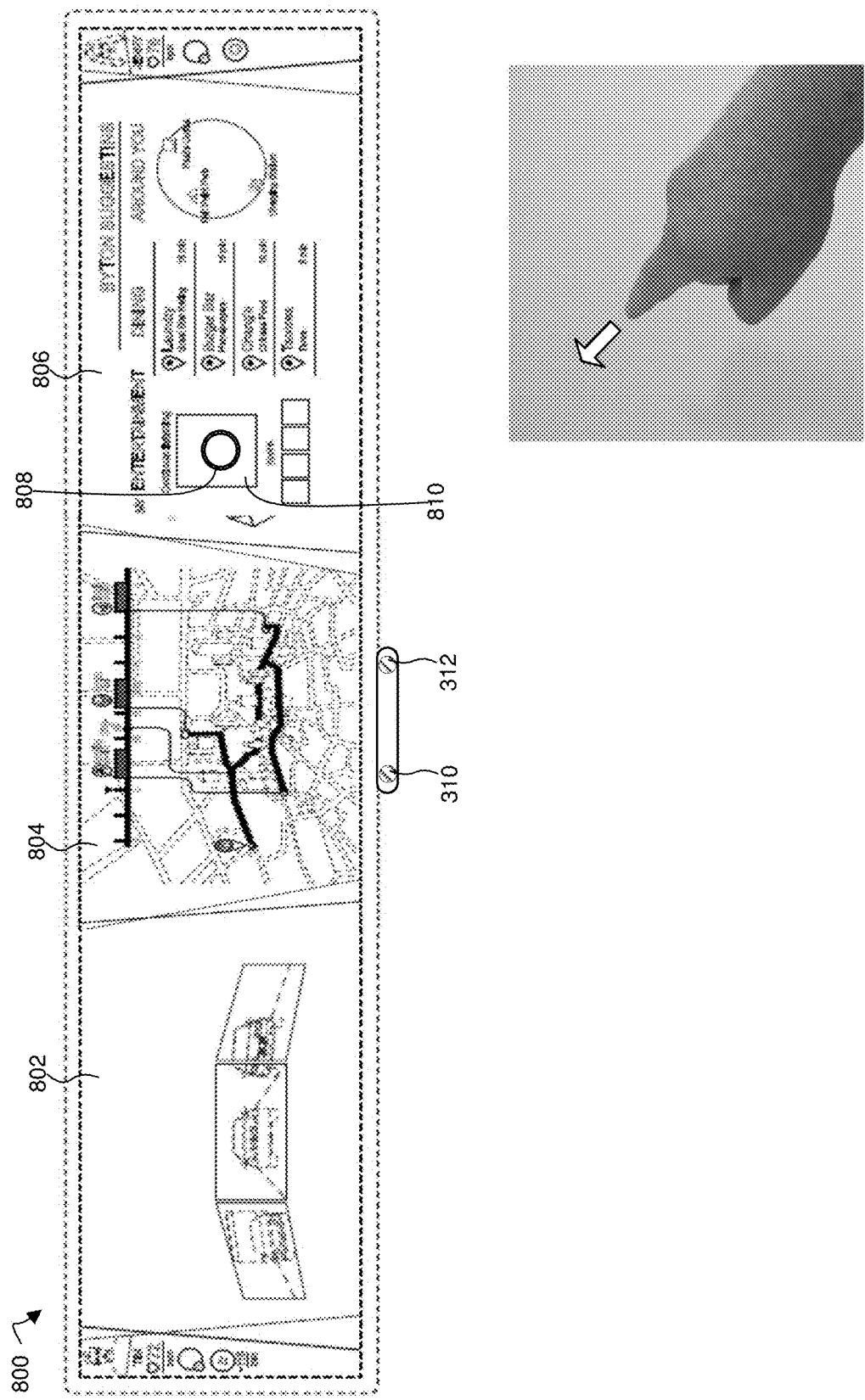
FIGS. 8A-8C are diagrams of embodiments of user interaction to select information from a display.

FIG. 8A illustrates an embodiment of a user selecting an item from a display. Display 800 is a single display with three software-definable display regions 802, 804, and 806. Among other things, display region 806 shows entertainment options, such as music that can be played in the car. In the illustrated embodiment, the user extends their index finger and points toward display region 806, causing circular cursor 808 to appear. To select an item from the display, the user moves their hand with the index finger still extended and, as the hand moves, cursor 808 follows the index finger, tracking the finger's motion in substantially real time, and stopping when the finger stops. When cursor 808 reaches desired item 810, the user thrusts the hand, or just the index finger, toward the screen—as if trying to poke the screen, as shown by the arrow—to confirm that item 810 is the desired selection.

Figure 8B:
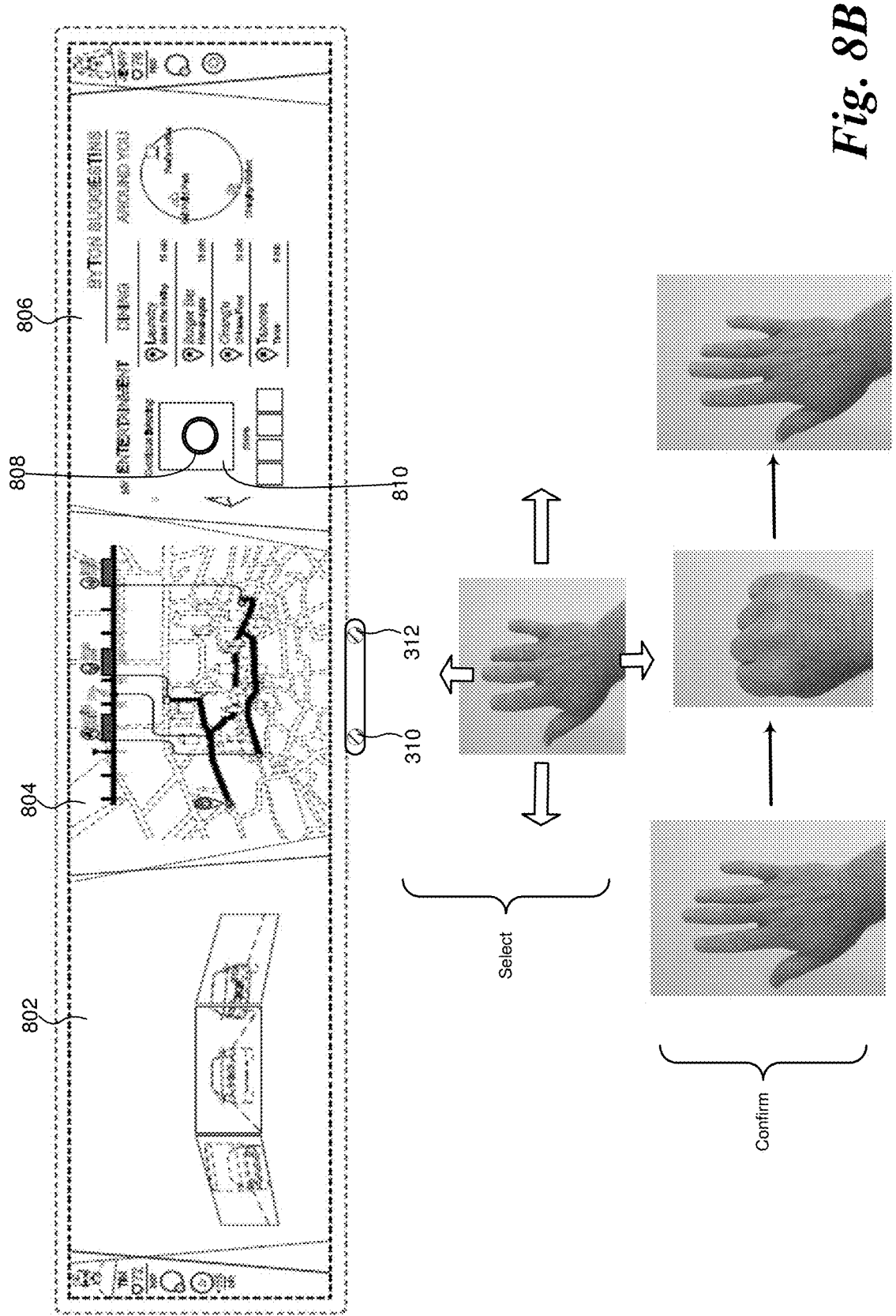

FIG. 8B illustrates an embodiment of a user selecting an item from display 800. In the illustrated embodiment, the user selects an item by extending the thumb, index, middle, ring, and pinky fingers to form an open hand with the palm facing display region 806, causing circular cursor 808 to appear. To select an item from the display the user moves the hand and, as the hand moves, cursor 808 follows the hand, tracking the hand's motion in substantially real time, and stopping when the hand stops. When cursor 808 reaches desired item 810, the user confirms this item as their selection by quickly closing the hand to a fist, then opening the hand again to return to an open hand with the palm facing the display. Although the illustrated embodiment uses an open hand gesture with all four of the index, middle, ring, and pinky fingers extended, other embodiments need not use all four fingers; a gesture using one, two, or three of these fingers can be used, with the number of fingers that need to be closed to form the confirmation gesture (e.g., closing the hand to form a fist or a pinching gesture) being modified accordingly.

Figure 8C:
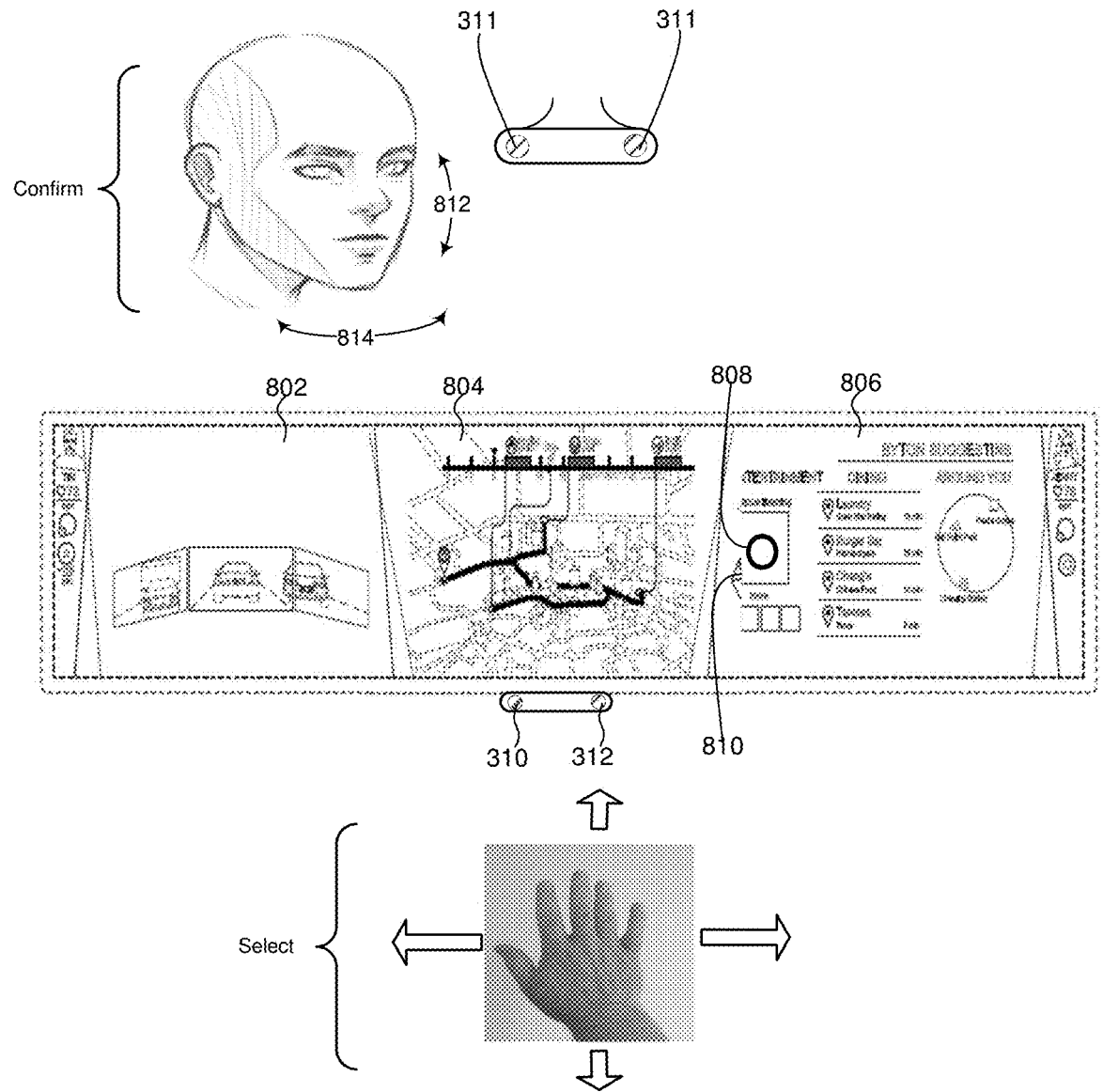

FIG. 8C illustrates an embodiment of a user selecting an item from display 800. In the illustrated embodiment, the user selects an item by extending the thumb, index, middle, ring, and pinky fingers to form an open hand with the palm facing display region 806, causing circular cursor 808 to appear. To select an item from the display the user moves the hand and, as the hand moves, cursor 808 follows the hand, tracking the hand's motion in substantially real time, and stopping when the hand stops. When cursor 808 reaches desired item 810, the user confirms this item as their selection by nodding their head in an up-and-down motion 812 to indicate yes. In an embodiment where the system suggests something to the user, the user can decline the suggestion by shaking their head in a side-to-side motion 814, indicating no. Although the illustrated embodiment uses an open hand gesture with all four of the index, middle, ring, and pinky fingers extended, other embodiments need not use all four fingers; a gesture using one, two, or three of these fingers can be used. Other embodiments can also use different head motions than shown.

FIGS. 9A-9D illustrate an embodiment of selecting and deleting an item from the timeline. Display 900 is a single display with three software-definable display regions 902, 904, and 906. The map and timeline are shown in center display region 904. In some embodiments, user account 104 can use the data from remote user data sources 102a-102c, or computer 112 can use data from the local data storage 126, to provide suggestions to the user on another display, which the user can then add to their schedule using the map display. For instance, if a health app indicates that the user plays tennis, the map indicates that the user is near a tennis club, and the schedule indicates that there is a three-hour gap in the afternoon, the system can suggest a tennis practice to the user during that three-hour gap.

Figure 9A:
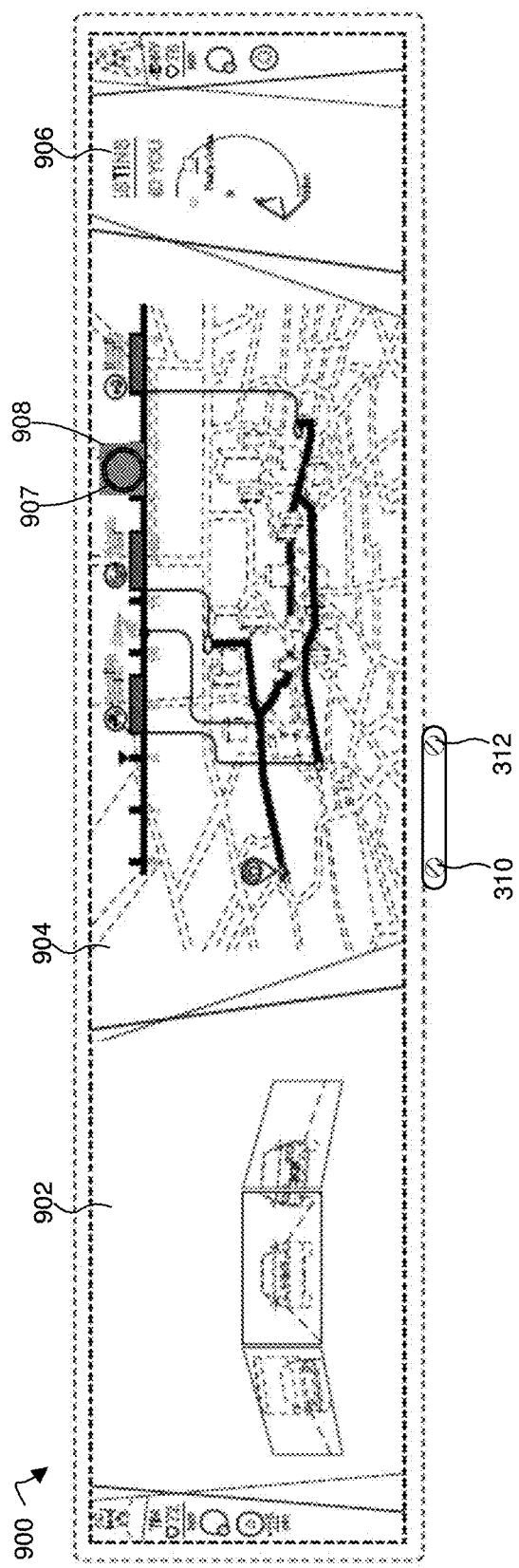
FIGS. 9A-9D are diagrams of embodiments of user interaction to select and delete information from a display.
Figure 9A:
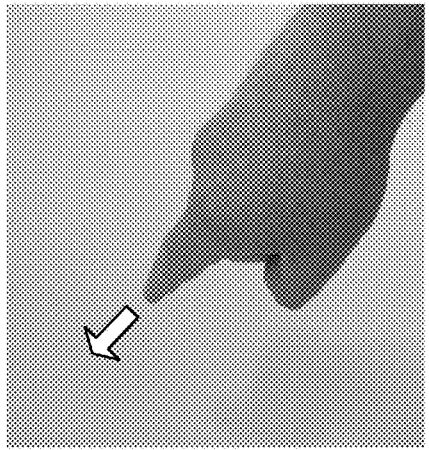
Figure 9B:
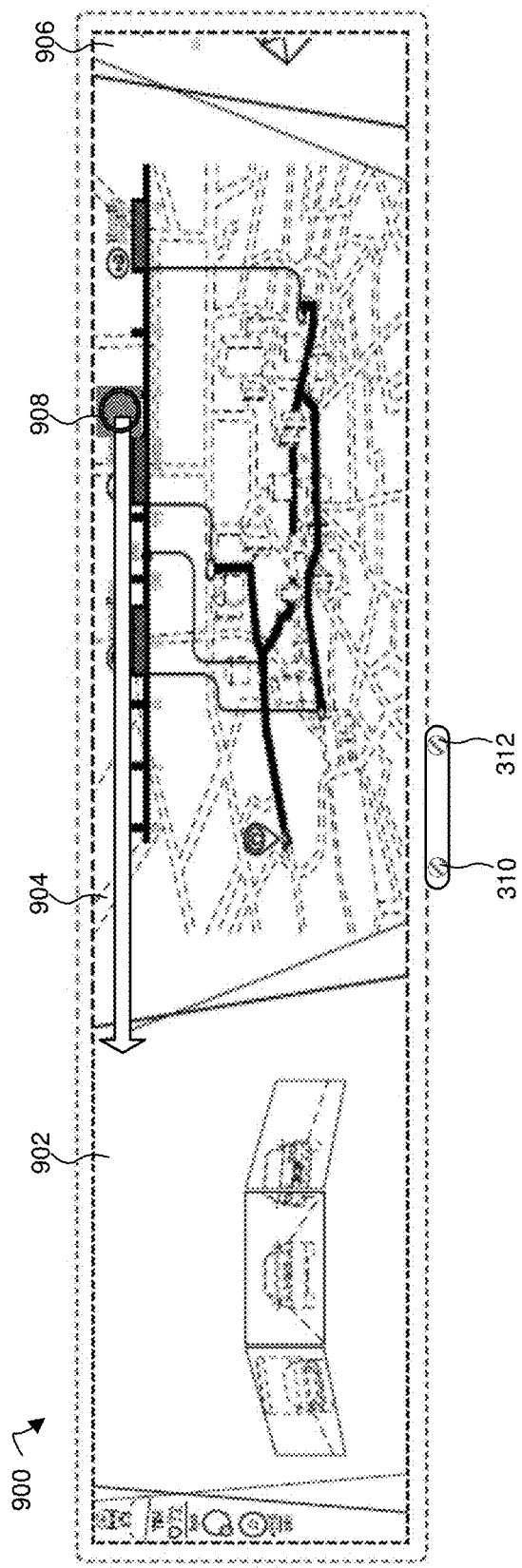
Figure 9B:
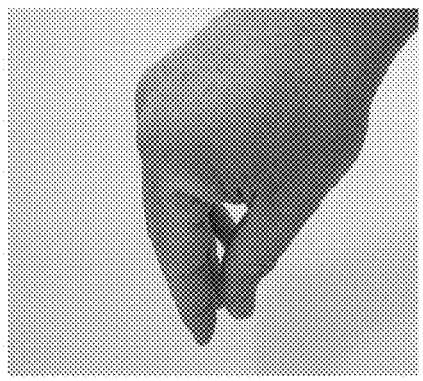
Figure 9B:
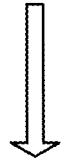
Figure 9B:
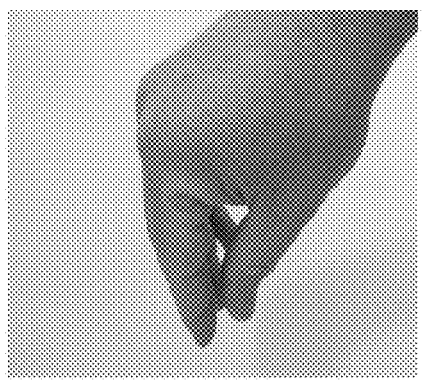

FIGS. 9A-9B illustrate a first embodiment. In the illustrated embodiment, the system has suggested event 908 by automatically showing it on the timeline. If the user wants to decline suggested event 908, the user extends their index finger and points toward the timeline in display region 904. With the index finger still extended, the user moves their hand and, as the hand moves circular cursor 907 tracks the finger's motion along the timeline in substantially real time. When circular cursor 907 is over event 908, the user thrusts the hand, or just the index finger, toward the screen—as if trying to poke the screen, as shown by the arrow—to select event 908. Having selected event 908, as shown in FIG. 9B, the user changes to a pinching gesture, with the index, middle, and possibly the ring and pinky fingers brought together with the thumb, as if grasping the item. With the hand still making the pinching gesture, the user moves their hand toward the display region 902, as shown by the arrow, and selected item 908 correspondingly move from display region 904 to display region 902, tracking the hand's motion in substantially real time, as shown by the arrow. As soon event 908 is no longer in display region 904 it is automatically deleted from the timeline and all necessary data sources are uploaded accordingly.

Figure 9C:
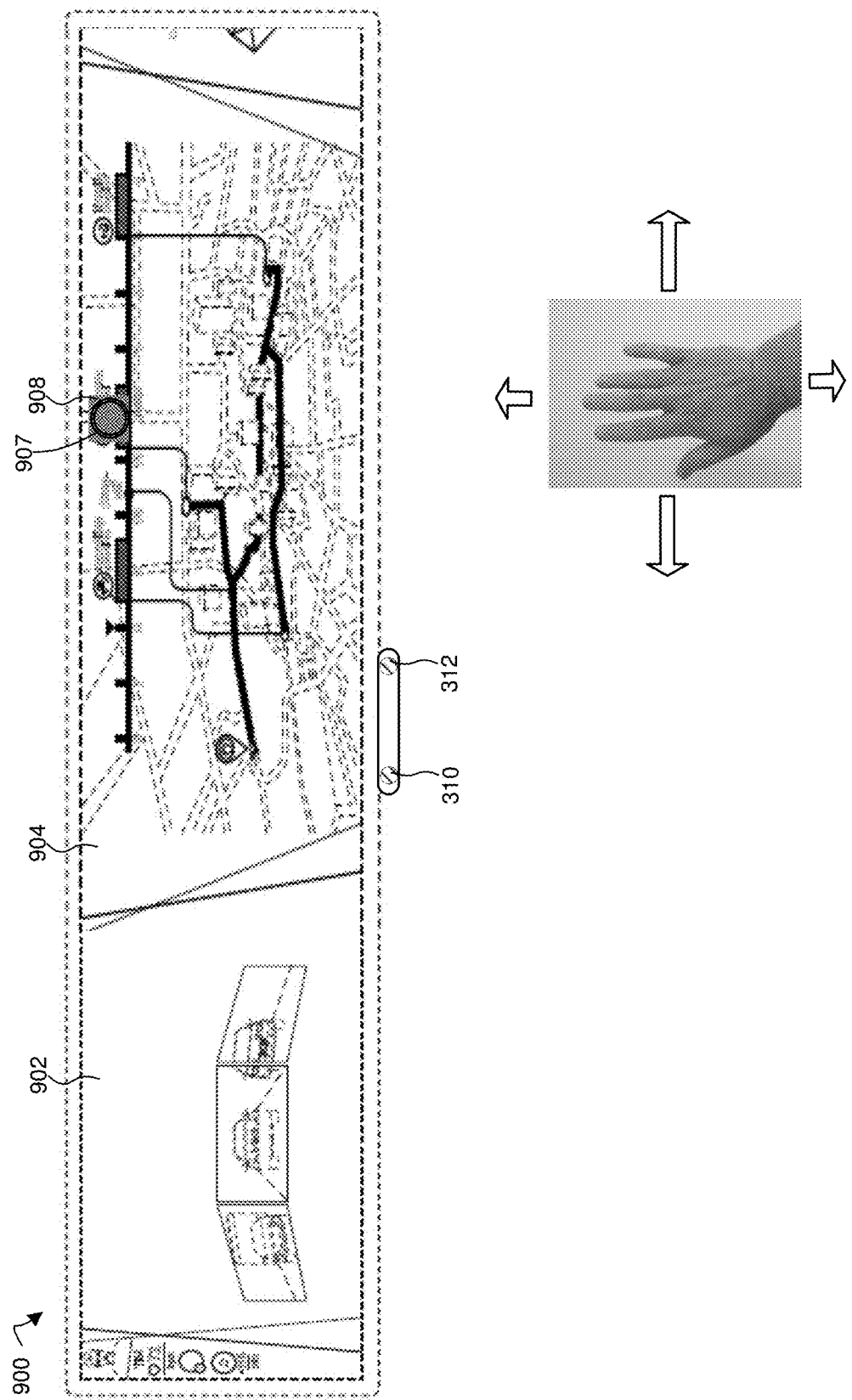
Figure 9D:
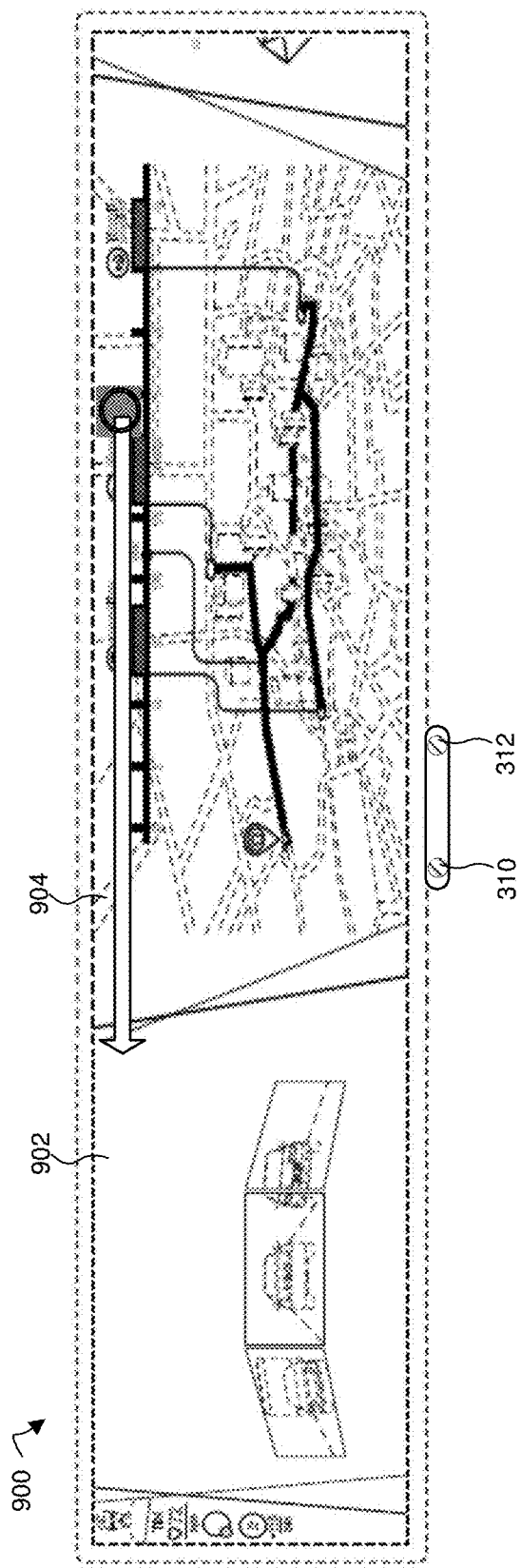
Figure 9D:
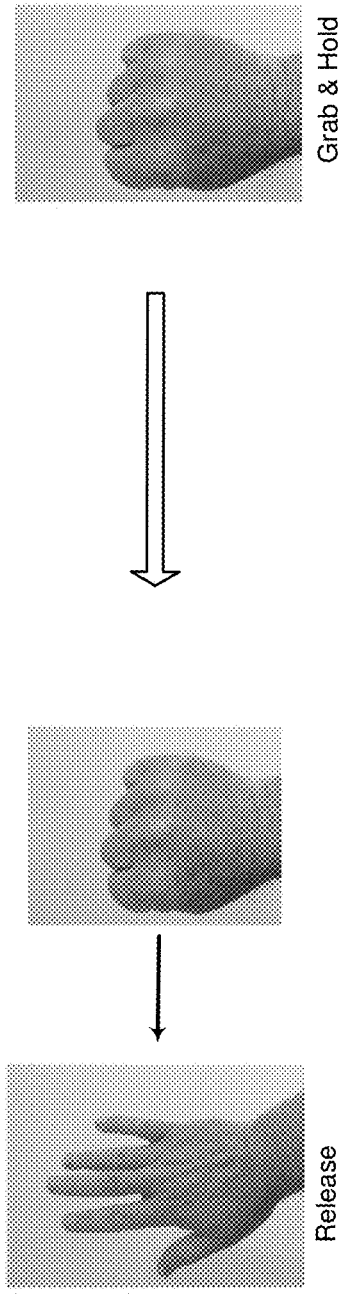

FIGS. 9C-9D illustrate another embodiment. If a user wants to decline suggested event 908, the user extends their thumb, index, middle, ring, and pinky fingers to form an open hand with the palm facing the display. With the hand still open, the user moves their hand and, as the hand moves the hand's motion is tracked by cursor 907 and displayed in substantially real time. As shown in FIG. 9D, when cursor 907 reaches suggested event 908, the user closes the hand to make a fist—as if grabbing suggested event 908—to select event 908. Having selected suggested event 908, the user, with the hand still forming a fist, moves their hand toward the display region 902, thus dragging suggested event 908 toward display region 902. Item 908 correspondingly moves from display region 904 to display region 902, tracking the hand's motion in substantially real time, as shown by the arrow. When event 908 is no longer in display region 904, the user releases the item, thus deleting it, by opening the hand again to return to an open hand with the palm facing the display. Although the illustrated embodiment uses an open hand gesture with the index, middle, ring, and pinky fingers extended, other embodiments need not use all four fingers; a gesture using one, two, or three of these fingers can be used, with the number of fingers that need to be closed to form the selection gesture (e.g., closing the hand to form a fist or a pinching gesture) being modified accordingly.

Figure 10A:
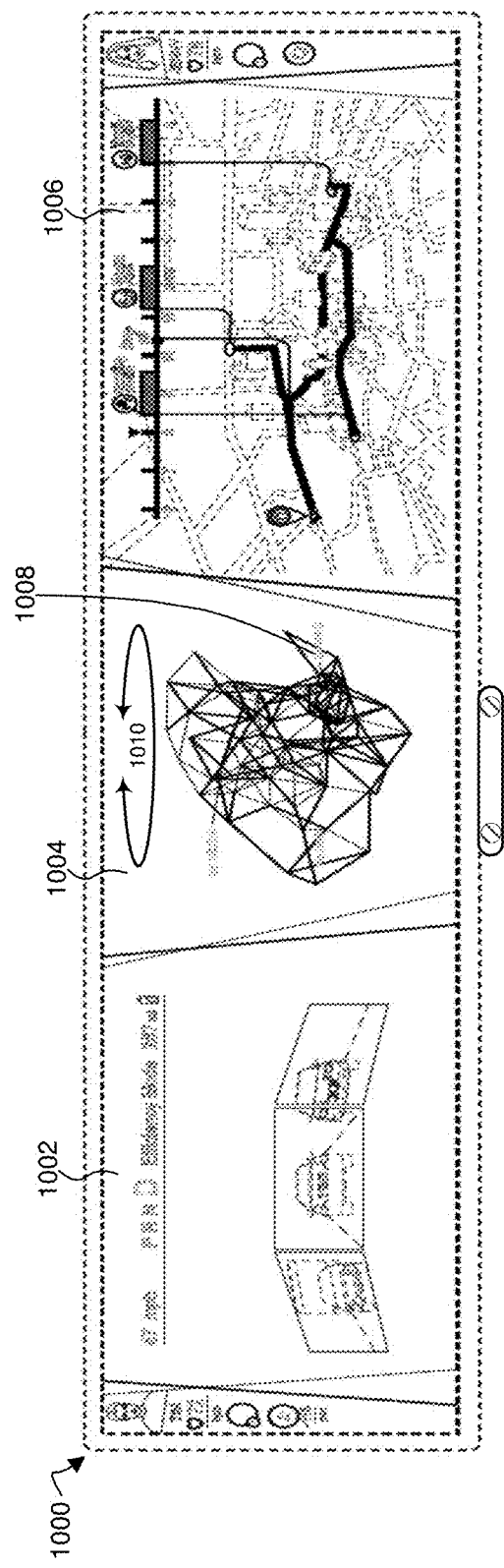
FIGS. 10A-10C are diagrams of embodiments of user interaction to rotate a three-dimensional interface shown on a display.
Figure 10A:
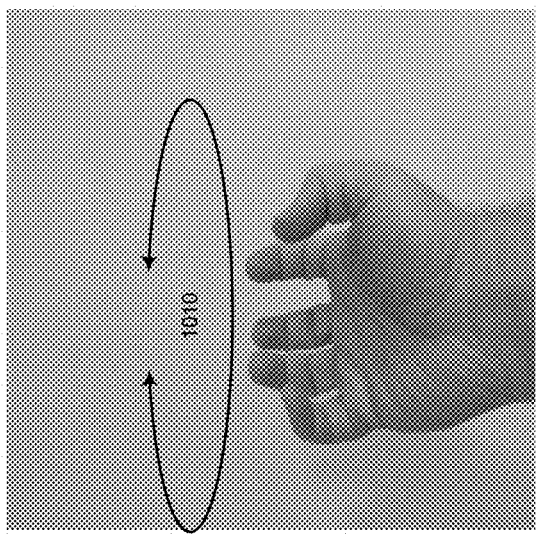
Figure 10B:
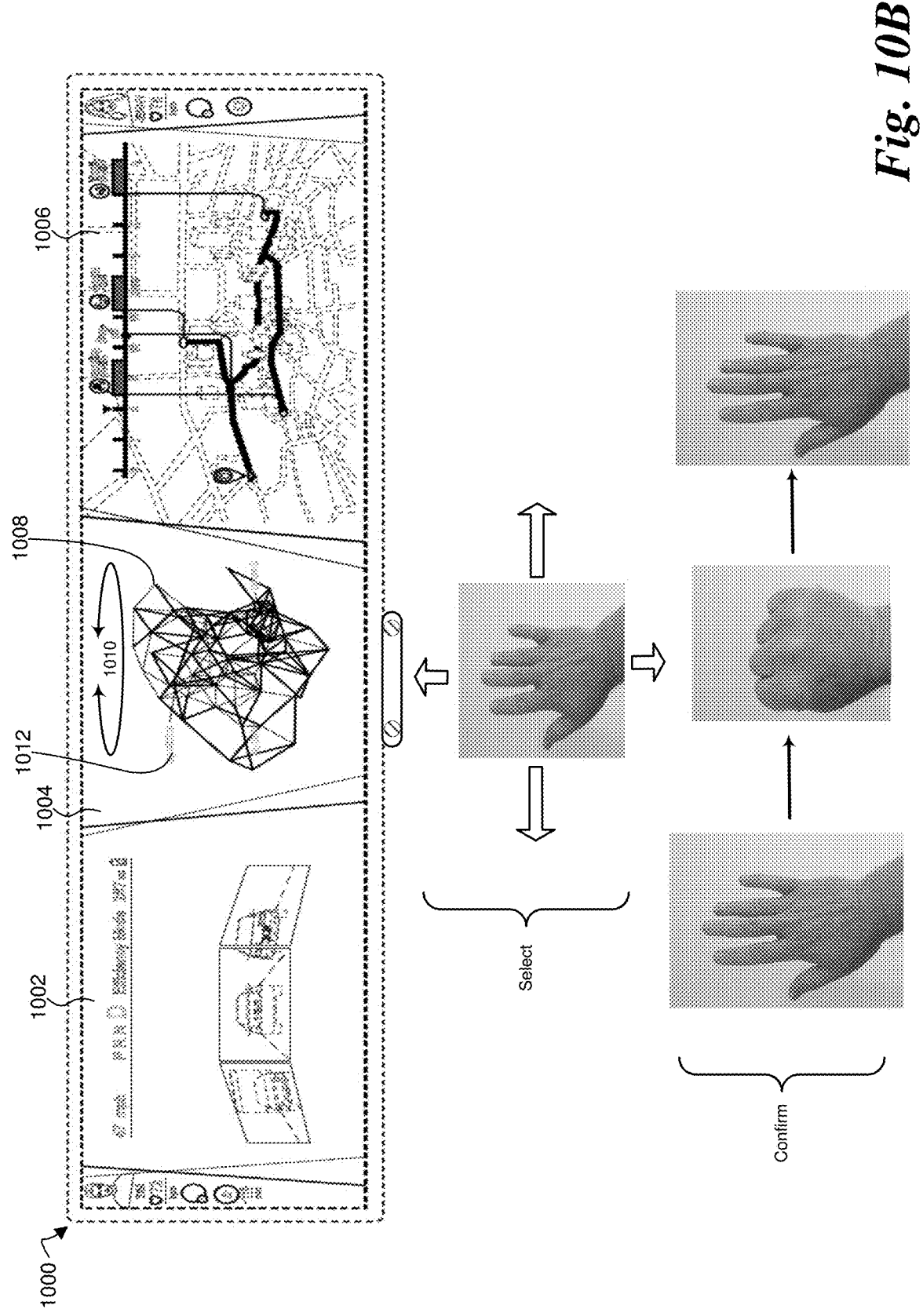
Figure 10C:
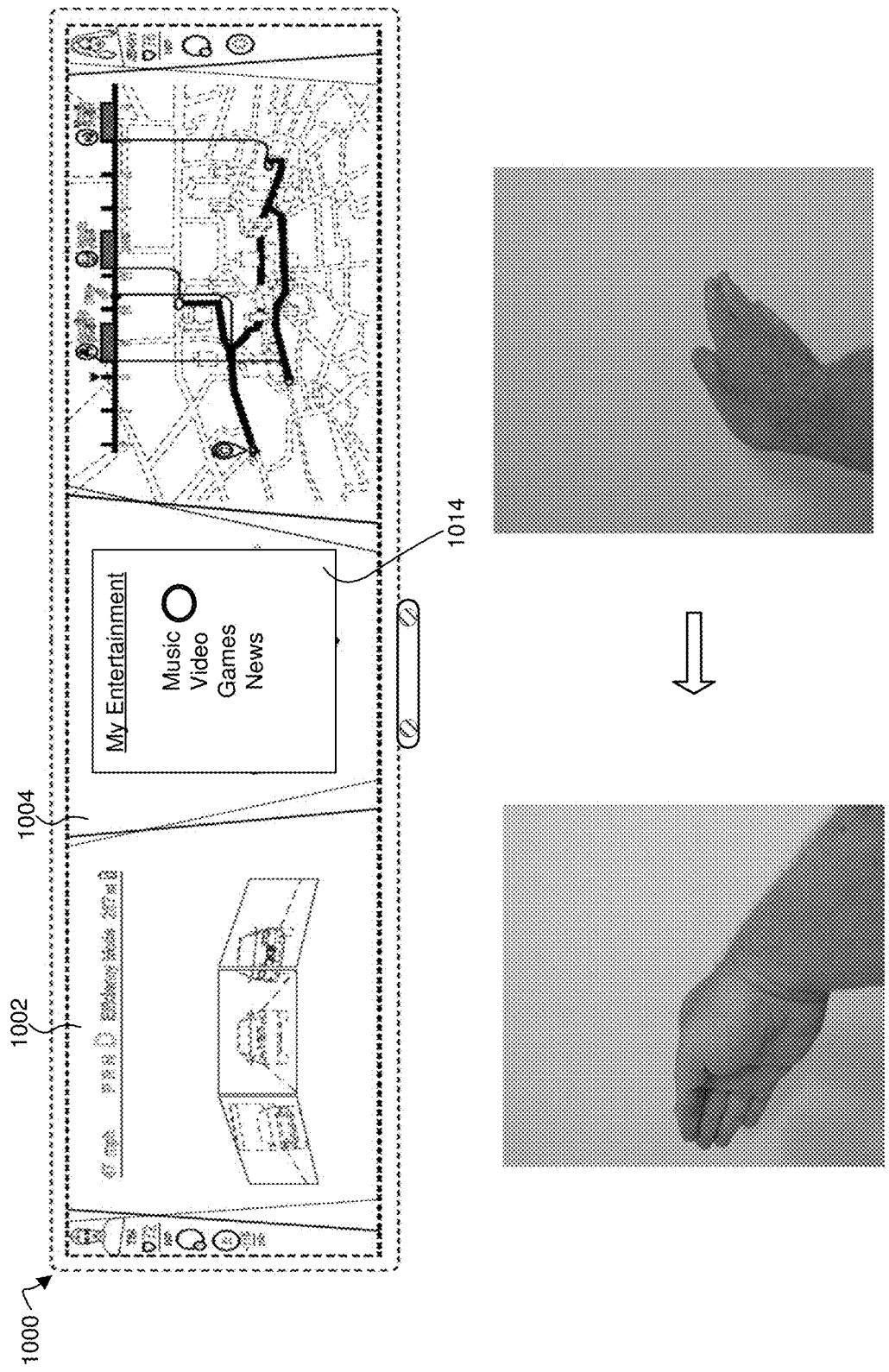

FIGS. 10A-10C illustrate embodiments of a user selecting an item from a display. Display 1000 is a single display with three software-definable display regions 1002, 1004, and 1006. Among other things, display region 1004 shows a three-dimensional user interface object 1008, with various selectable user options 1012 positioned around it. FIG. 10A illustrates an embodiment. In the illustrated embodiment, the user holds their hand in a cradling position, as if cradling object 1008. With the hand still in the cradling position, the user rotates the hand and, as the hand rotates object 1008 follows the hand rotation, tracking the hand's motion in substantially real time, and stopping when the hand stops. When object 1008 is stops with a particular user option positioned in front (i.e., appearing closest to the user), that option is automatically selected.

FIG. 10B illustrates another embodiment. In this embodiment, the user holds their hand with the thumb, index, middle, ring, and pinky fingers extended, so that the hand is open with the palm facing the display. With the hand open, the user then moves their hand up and down or side-to-side and, as the hand moves, the rotation of three-dimensional interface object 1008 follows the hand movement, tracking the hand's motion in substantially real time, and stopping when the hand stops. When the user has the desired selectable user option 1012 in the front (i.e., appearing closest to the user), the user then confirms that option 1012 as their selection by quickly closing the hand to a fist, then opening the hand again to return to an open hand with the palm facing the display. Although the illustrated embodiment uses an open hand gesture with the index, middle, ring, and pinky fingers extended, other embodiments need not use all four fingers; a gesture using one, two, or three of these fingers can be used, with the number of fingers that need to be closed to form the confirmation gesture (e.g., closing the hand to form a fist or a pinching gesture) being modified accordingly.

FIG. 10C illustrates an embodiment of a gesture for reversing an action. In the illustrated embodiment the user has selected a user option 1012 from three-dimensional user interface object 1008. Selection of that item has caused a menu 1014 to appear. But if upon reviewing menu 1014 the user finds that what they wanted does not appear in the menu, they can return to three-dimensional user interface object 1008 by holding their hand open—with the thumb, index, middle, ring, and pinky fingers extended so that the palm faces sideways—and making a swiping motion, as if slapping something. In the illustrated embodiment the hand motion is from right to left, with some acceleration of the hand during the motion. But in other embodiments the hand motion can be from left to right. Although illustrated in the context of three-dimensional user interface object 1008 and associated menus, the illustrated gesture can be used in any contact in which the user wishes to reverse an action to return to a previous state. Although the illustrated embodiment uses an open hand gesture with the index, middle, ring, and pinky fingers extended, other embodiments need not use all four fingers; a gesture using one, two, or three of these fingers can be used.

Figure 11:
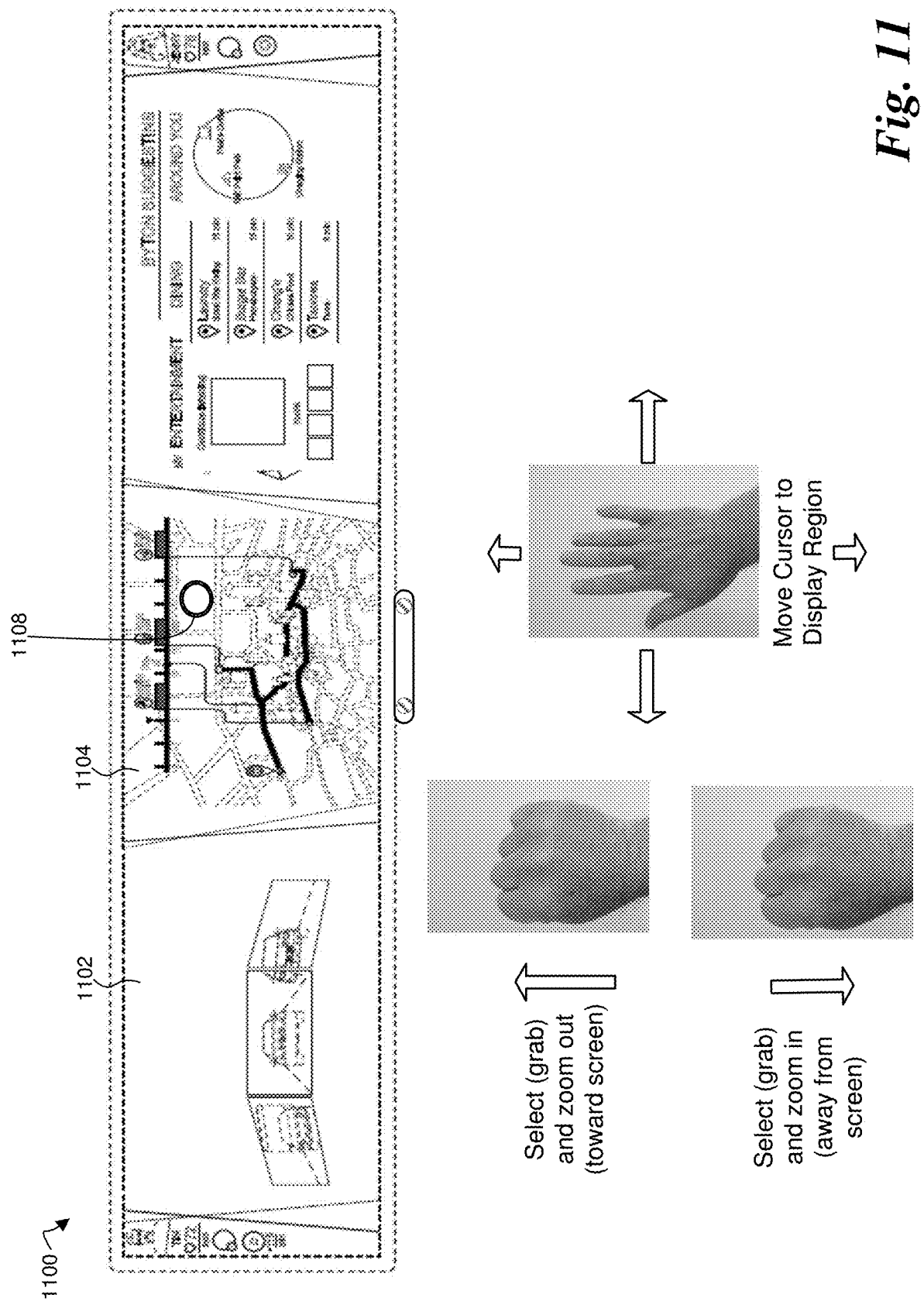
FIG. 11 is a diagram of an embodiment of user interaction to zoom in and zoom out items shown on a display.

FIG. 11 illustrates an embodiment of gestures and motions that can be used to modify the appearance of items on a display, for instance by making them appear larger (i.e., zooming in) or smaller (i.e., zooming out). In the illustrated embodiment the user extends their thumb, index, middle, ring, and pinky fingers to form an open hand with the palm facing the display. With the hand still open, the user moves their hand and, as the hand moves the hand's motion is tracked and displayed by cursor 1108 in substantially real time. When cursor 1108 is in the display region in which the user wants to zoom in or out (center display region 1104 with a map display in this embodiment), the user closes the hand to make a fist—as if grabbing display region 1104—to select it. Having selected display region 1104 the user, with their hand still forming a fist, moves their hand toward display region 1104 (i.e., toward the screen and/or the gesture camera), to enlarge (i.e., zoom in on) what is shown in the display, or moves their hand away from display region 1104 (i.e., away from the screen and/or the gesture camera), to make smaller (i.e., zoom our of) what is shown in the display.

FIG. 12 illustrates an embodiment of gestures and motions that can be used to activate or deactivate the gesture recognition system. In some instances, it can be useful for the gesture recognition system not to be active all the time. In a car, for instance, the driver and passenger might use many hand gestures and motions during a conversation, but might not intend for those gestures or motions to be seen or interpreted by the gesture recognition system. If the gesture recognition does see and interpret these gestures or motions, it could cause setting, selections, etc., to be inadvertently modified or it could cause items on a display to move around constantly, causing driver distraction. To prevent this, the system can be deactivated or, if not fully deactivated, set to where it doesn't show display motions that result from gestures. As a result, it can be necessary to have gestures and motions that partially or fully activate or deactivate the system.

In the illustrated embodiment, the system can examine an area 1208 for a specified time period and, if it sees no gestures or motions in the area for the specified time period it can partially or fully deactivate the gesture recognition. Alternatively, the gesture recognition system can be partially or fully deactivated by another event, such as when a hand touches steering wheel 1210. If the gesture recognition system has been partially or fully deactivated, it can be reactivated by the user by extending the thumb, index, middle, ring, and pinky fingers to form an open hand with the palm facing downward. This gesture is then held substantially stationary for a fixed period to activate the display.

The mapping system also has additional capabilities. The mapping system tracks how the user's day plays out. The mapping system can make adjustments based on changes. For example, if the location of an activity changes, the system automatically changes the location on the 3D map. If the start or end date of a meeting changes, for example, the system will automatically update the route. The system will automatically send the time changes to the people who will be at the meeting. Gestures can be used to change an appointment time. With very little input by the user, the car adjusts the pertinent information. For example, the system updates the calendar and tells friends about activities and changes to the activities.

The following examples pertain to further embodiments:

An apparatus comprising a computer including at least one processor, memory, storage, and a user input device; a user identification device coupled to the computer to identify an authorized user; a transceiver communicatively coupled to the computer to receive and transmit user data between the computer and one or more user data sources associated with the authorized user; a navigation system communicatively coupled to the computer, the navigation system including a position sensor and a database of map data; and one or more displays coupled to the computer; wherein the computer has instructions stored thereon which, when executed by the computer, cause it to: synchronize local user data in a local user data storage with the user data received from the one or more user data sources, wherein the local user data includes one or more user events and each user event is described by a dataset including at least a start time, an end time, and a location, construct a timeline for the authorized user based on the local user data over a specified time interval, wherein the timeline displays every user event that falls within the specified time interval, and simultaneously display the timeline and a map on one of the one or more displays, wherein the user's current position and the position of at least one user event from the timeline are identified on the map, wherein the computer has instructions stored thereon which, when executed by the computer, cause the computer to create the dataset for each event by combining user data retrieved from different user data sources.

An apparatus comprising a computer including at least one processor, memory, storage, and a user input device; a user identification device coupled to the computer to identify an authorized user; a transceiver communicatively coupled to the computer to receive and transmit user data between the computer and one or more user data sources associated with the authorized user; a navigation system communicatively coupled to the computer, the navigation system including a position sensor and a database of map data; and one or more displays coupled to the computer; wherein the computer has instructions stored thereon which, when executed by the computer, cause it to: synchronize local user data in a local user data storage with the user data received from the one or more user data sources, wherein the local user data includes one or more user events and each user event is described by a dataset including at least a start time, an end time, and a location, construct a timeline for the authorized user based on the local user data over a specified time interval, wherein the timeline displays every user event that falls within the specified time interval, and simultaneously display the timeline and a map on one of the one or more displays, wherein the user's current position and the position of at least one user event from the timeline are identified on the map, wherein the computer has instructions stored thereon which, when executed by the computer, cause the computer to suggest new events to the user based upon user data retrieved from the user data sources.

A system comprising an automobile including a driver's seat, one or more passenger seats, and a dashboard having one or more dashboard display therein; an interactive mapping system comprising: a computer including at least one processor, memory, storage, and a user input device; a user identification device coupled to the computer to identify an authorized user; a transceiver communicatively coupled to the computer to receive and transmit user data between the computer and one or more user data sources associated with the authorized user; a navigation system communicatively coupled to the computer, the navigation system including a position sensor and a database of map data; and wherein the computer is coupled to the one or more dashboard displays and has instructions stored thereon which, when executed by the computer, cause it to synchronize local user data in a local user data storage with the user data received from the one or more user data sources, wherein the local user data includes one or more user events and each user event is described by a dataset including at least a start time, an end time, and a location, to construct a timeline for the authorized user based on the local user data over a specified time interval, wherein the timeline displays every user event that falls within the specified time interval, and to simultaneously display the timeline and a map one of the one or more dashboard displays, wherein the user's current position and the position of at least one user event from the timeline are identified on the map, wherein the computer has instructions stored thereon which, when executed by the computer, cause the computer to create the dataset for each event by combining user data retrieved from different user data sources.

A system comprising an automobile including a driver's seat, one or more passenger seats, and a dashboard having one or more dashboard display therein; an interactive mapping system comprising: a computer including at least one processor, memory, storage, and a user input device; a user identification device coupled to the computer to identify an authorized user; a transceiver communicatively coupled to the computer to receive and transmit user data between the computer and one or more user data sources associated with the authorized user; a navigation system communicatively coupled to the computer, the navigation system including a position sensor and a database of map data; and wherein the computer is coupled to the one or more dashboard displays and has instructions stored thereon which, when executed by the computer, cause it to synchronize local user data in a local user data storage with the user data received from the one or more user data sources, wherein the local user data includes one or more user events and each user event is described by a dataset including at least a start time, an end time, and a location, to construct a timeline for the authorized user based on the local user data over a specified time interval, wherein the timeline displays every user event that falls within the specified time interval, and to simultaneously display the timeline and a map one of the one or more dashboard displays, wherein the user's current position and the position of at least one user event from the timeline are identified on the map, wherein the computer has instructions stored thereon which, when executed by the computer, cause the computer to suggest new events to the user based upon user data retrieved from the user data sources.

A method comprising synchronizing local user data in a local user data storage with user data received from one or more user data sources, wherein the local user data includes one or more user events and each user event is described by a dataset including at least a start time, an end time, and a location; constructing a timeline for an authorized user based on the local user data over a specified time interval, wherein the timeline displays every user event that falls within the specified time interval; simultaneously displaying the timeline and a map on one of one or more displays, wherein the user's current position and the position of at least one user event from the timeline are identified on the map, and creating the dataset for each event by combining user data retrieved from different user data sources.

A method comprising synchronizing local user data in a local user data storage with user data received from one or more user data sources, wherein the local user data includes one or more user events and each user event is described by a dataset including at least a start time, an end time, and a location; constructing a timeline for an authorized user based on the local user data over a specified time interval, wherein the timeline displays every user event that falls within the specified time interval; simultaneously displaying the timeline and a map on one of one or more displays, wherein the user's current position and the position of at least one user event from the timeline are identified on the map, and suggesting new events to the user based upon user data retrieved from the user data sources.

The above description of embodiments, including what is described in the abstract, is not intended to be exhaustive or to limit the invention to the described forms. Specific embodiments of, and examples are described for illustrative purposes, but various equivalent modifications are possible within the scope of the invention in light of the above detailed description, as those skilled in the relevant art will recognize.

What is claimed is:
1. An apparatus comprising:
a computer including at least one processor, memory, storage, and a user input device;
a user identification device comprising a user identification sensor coupled to the at least one processor to identify an authorized user;

a transceiver communicatively coupled to the computer to receive and transmit user data between the computer and one or more user data sources associated with the authorized user;

a navigation system communicatively coupled to the computer, the navigation system including a position sensor and a database of map data; and one or more displays coupled to the computer;

wherein the memory has instructions stored thereon which, when executed by the processor, cause the processor to:

synchronize local user data in a local user data storage with the user data received from the one or more user data sources, wherein the local user data includes one or more user events and each user event is described by a dataset including at least a start time, an end time, and a location, construct a timeline for the authorized user based on the local user data over a specified time interval, wherein the timeline displays every user event that falls within the specified time interval, display a first map comprising a first portion and a second portion on one of the one or more displays; and simultaneously display, on the first map, the timeline including at least one user event on the first portion and a navigation map on the second portion, the navigation map indicating a position of at least one user event and a current position of the user, and a connection between the at least one user event on the timeline and the position of the at least one user event on the navigation map to provide an interactive mapping for a vehicle.

2. The apparatus of claim 1 wherein the user input device is a gesture recognition system.

3. The apparatus of claim 2 wherein the gesture recognition system is configured to interact with the first map comprising the timeline and the navigation map in response to a user gesture.

4. The apparatus of claim 3 wherein the interacting with the first map comprises modifying existing events, deleting existing events, and adding new events to the timeline.

5. The apparatus of claim 4 wherein the modifying existing events, the deleting existing events, or the adding new events to the timeline automatically updates the local user data storage and the user data sources.

6. The apparatus of claim 4 wherein the adding the new events comprises selecting a new event from another display and dragging the new event to the first map using the gesture recognition system.

7. The apparatus of claim 3 wherein the interacting with the first map comprises at least one of panning, zooming, and rotating the first map.

8. The apparatus of claim 1 wherein the timeline includes an indicator of the current time.

9. The apparatus of claim 1 wherein the one or more user data sources include a calendar application and a contacts application.

10. The apparatus of claim 9 wherein the one or more user data sources further include social media accounts and a health application account that includes data associated with a user heart rate.

11. The apparatus of claim 1 wherein the one or more user data sources comprise a user account that collects data from one or more of a calendar application, a contacts application, social media accounts, and a health application account that includes data associated with a user heart rate.

12. The apparatus of claim 1 wherein the one or more user data sources are user accounts on remote servers.

13. The apparatus of claim 1 wherein the one or more user data sources are applications on the user's mobile phone.

14. The apparatus of claim 1 wherein the computer has instructions stored thereon which, when executed by the computer, cause the computer to create the dataset for each event by combining user data retrieved from the one or more user data sources.

15. The apparatus of claim 1 wherein the computer has instructions stored thereon which, when executed by the computer, cause the computer to suggest new events to the user based upon the user data retrieved from the one or more user data sources.

16. The apparatus of claim 1 wherein the computer has instructions stored thereon which, when executed by the computer, cause the computer to periodically interrogate the one or more user data sources to determine if there have been any changes in the user data and, if there are any changes, to update the local user data accordingly.

17. The apparatus of claim 1, further comprising a user feedback system coupled to the computer.

18. The apparatus of claim 17 wherein the user feedback system is a haptic feedback system.

19. The apparatus of claim 1 wherein the user identification device is a facial recognition system, a biometric system, or a username/password system.

20. A system comprising:

an automobile including a driver's seat, one or more passenger seats, and a dashboard having one or more dashboard display therein;

an interactive mapping system comprising:

a computer including at least one processor, memory, storage, and a user input device;

a user identification device comprising a user identification sensor coupled to the at least one processor to identify an authorized user;

a transceiver communicatively coupled to the computer to receive and transmit user data between the computer and one or more user data sources associated with the authorized user;

a navigation system communicatively coupled to the computer, the navigation system including a position sensor and a database of map data; and wherein the computer is coupled to the one or more dashboard displays and has instructions stored thereon which, when executed by the computer, cause the computer to:

synchronize local user data in a local user data storage with the user data received from the one or more user data sources, wherein the local user data includes one or more user events and each user event is described by a dataset including at least a start time, an end time, and a location, construct a timeline for the authorized user based on the local user data over a specified time interval, wherein the timeline displays every user event that falls within the specified time interval, display a first map comprising a first portion and a second portion on one of the one or more dashboard displays; and simultaneously display, on the first map, the timeline including at least one user event on the first portion, and a navigation map on the second portion, the navigation map indicating a position of at least one user event, and a current position of the user, and a connection between the at least one user event on the timeline and the position of the at least one user event on the navigation map to provide an interactive mapping for a vehicle.

21. The system of claim 20 wherein the user input device is a gesture recognition system.

22. The system of claim 21 wherein the gesture recognition system is configured to interact with the first map comprising the timeline and the navigation map in response to a user gesture.

23. The system of claim 22 wherein the interacting with the first map comprises modifying existing events, deleting existing events, and adding new events to the timeline.

24. The system of claim 23 wherein the modifying existing events, the deleting existing events, or the adding new events to the timeline automatically updates the local user data storage and the user data sources.

25. The system of claim 23 wherein the adding the new events comprises selecting a new event from one dashboard display and dragging the new event to the dashboard display on which the first map is shown using the gesture recognition system.

26. The system of claim 22 wherein the interacting with the first map comprises at least one of panning, zooming, and rotating the first map.

27. The system of claim 20 wherein the timeline includes an indicator of the current time.

28. The system of claim 20 wherein the one or more user data sources include a calendar application and a contacts application.

29. The system of claim 28 wherein the one or more user data sources further include social media accounts and a health-application account that includes data associated with a user heart rate.

30. The system of claim 20 wherein the one or more user data sources comprise a user account that collects data from one or more of a calendar application, a contacts application, social media accounts, and a health application account that includes data associated with a user heart rate.

31. The system of claim 20 wherein the one or more user data sources are user accounts on remote servers.

32. The system of claim 20 wherein the one or more user data sources are applications on the user's mobile phone.

33. The system of claim 20 wherein the computer has instructions stored thereon which, when executed by the computer, cause the computer to create the dataset for each event by combining user data retrieved from the one or more user data sources.

34. The system of claim 20 wherein the computer has instructions stored thereon which, when executed by the computer, cause the computer to suggest new events to the user based upon the user data retrieved from the one or more user data sources.

35. The system of claim 20 wherein the computer has instructions stored thereon which, when executed by the computer, cause the computer to periodically interrogate the one or more user data sources to determine if there have been any changes in the user data and, if there are any changes, to update the local user data accordingly.

36. The system of claim 20, further comprising a user feedback system coupled to the computer.

37. The system of claim 36 wherein the user feedback system is a haptic feedback system.

38. The system of claim 37 wherein the user identification device is a facial recognition system, a biometric system, or a username/password system.

39. A method comprising:
synchronizing, by a processor coupled to a vehicle, local user data in a local user data storage with user data received from one or more user data sources, wherein the local user data includes one or more user events and each user event is described by a dataset including at least a start time, an end time, and a location;
constructing, by the processor, a timeline for an authorized user based on the local user data over a specified time interval, wherein the timeline displays every user event that falls within the specified time interval;
displaying a first map comprising a first portion and a second portion on one of display devices coupled to the processor; and
simultaneously displaying by the processor, on the first map, the timeline including at least one user event on the first portion and a navigation map on the second portion, the navigation map indicating a position of at least one user event and a current position of the user, and a connection between the at least one user event on the timeline and the position of the at least one user event on the navigation map to provide an interactive mapping for the vehicle, wherein the processor is configured to determine whether the timeline has been modified, and wherein the processor is configured to update the user data when the timeline has been modified.

40. The method of claim 39, further comprising interacting with the first map including the timeline and the navigation map using a gesture recognition system coupled to the processor.

41. The method of claim 40 wherein interacting with the timeline includes modifying existing events, deleting existing events, and adding new events using the gesture recognition system coupled to the processor.

42. The method of claim 41, further comprising automatically updating, by the processor, the local user data storage and the user data sources after modifying existing events, deleting existing events, or adding new events to the timeline.

43. The method of claim 41 wherein adding the new events comprises selecting a new event from another display and dragging the new event to the map.

44. The method of claim 40 wherein interacting with the first map includes panning, zooming, and rotating the first map using the gesture recognition system coupled to the processor.

45. The method of claim 39, further comprising displaying an indicator of the current time on the timeline.

46. The method of claim 39 wherein the one or more user data sources include a calendar application and a contacts application.

47. The method of claim 46 wherein the one or more user data sources further include social media accounts and a health application account that includes data associated with a user heart rate.

48. The method of claim 39 wherein the one or more user data sources comprise a user account that collects data from one or more of a calendar application, a contacts application, social media accounts, and a health application account that includes data associated with a user heart rate.

49. The method of claim 39 wherein the one or more user data sources are user accounts on remote servers.

50. The method of claim 39 wherein the one or more user data sources are applications on the user's mobile phone.

51. The method of claim 39, further comprising creating the dataset for each event by combining user data retrieved from the one or more user data sources.

52. The method of claim 39, further comprising suggesting new events to the user based upon the user data retrieved from the one or more user data sources.

53. The method of claim 39, further comprising periodically interrogating the one or more user data sources to determine if there have been any changes in the user data and, if there are any changes, updating the local user data accordingly.

54. The method of claim 39, further comprising providing a feedback to the user.

55. The method of claim 54 wherein the feedback is a haptic feedback.

* * * * *